US011897745B2

(12) United States Patent
Spandl et al.

(10) Patent No.: US 11,897,745 B2
(45) Date of Patent: Feb. 13, 2024

(54) CONTROL CAM FOR A CLAMPING DEVICE, AND CLAMPING DEVICE FOR HOLDING A CONTAINER

(71) Applicant: KRONES AG, Neutraubling (DE)

(72) Inventors: Stefan Spandl, Neutraubling (DE); Bruno Landler, Neutraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/058,509

(22) Filed: Nov. 23, 2022

(65) Prior Publication Data

US 2023/0159314 A1 May 25, 2023

(30) Foreign Application Priority Data

Nov. 25, 2021 (DE) ...................... 10 2021 131 002.4

(51) Int. Cl.
*B67C 3/24* (2006.01)
*F16B 2/10* (2006.01)
*F16B 2/18* (2006.01)

(52) U.S. Cl.
CPC .................. *B67C 3/24* (2013.01); *F16B 2/10* (2013.01); *F16B 2/185* (2013.01)

(58) Field of Classification Search
CPC ......... B67C 3/242; B67C 3/24; B65G 47/847; F16B 2/10; F16B 2/185
USPC ....................................... 248/313; 198/470.1
See application file for complete search history.

(56) References Cited

U.S. PATENT DOCUMENTS

| 5,711,411 | A  | * | 1/1998 | Zurweller | ............... | B67C 3/242 |
|---|---|---|---|---|---|---|
| | | | | | | 198/470.1 |
| 6,513,643 | B2 | * | 2/2003 | Nakada | ................... | B07C 5/122 |
| | | | | | | 198/379 |
| 6,938,753 | B2 | * | 9/2005 | Bonatti | ............... | B65G 47/847 |
| | | | | | | 198/470.1 |
| 8,833,824 | B2 | * | 9/2014 | Fahldieck | ............ | B65G 47/847 |
| | | | | | | 198/470.1 |

(Continued)

FOREIGN PATENT DOCUMENTS

DE   10 2005 014 838      10/2006
DE   10 2012 218 204 A1   4/2014

(Continued)

OTHER PUBLICATIONS

Extended European Search Report dated Apr. 24, 2023 for EP Application No. 22209633.1; 8 pages.

*Primary Examiner* — Todd M Epps
(74) *Attorney, Agent, or Firm* — Haynes and Boone, LLP

(57) ABSTRACT

A clamping device including a control cam and a control cam for controlling the position of clamping arms which are pivotable relative to one another, each with a holding portion in a clamping device, including a shaft portion for pivotable mounting of the control cam about a control cam pivot axis in a hub portion of a carrier plate of the clamping device, and at least one coupling element for coupling the control cam to a clamping arm of the clamping device, wherein the control cam is pivotable about the control cam pivot axis between a predefined open position and a predefined closed position, and the at least one coupling element is configured in the form of a slotted groove for receiving a control bolt arranged on a clamping arm, or in the form of a control bolt for penetration into a slotted groove arranged on a control arm.

20 Claims, 17 Drawing Sheets

(56) References Cited

U.S. PATENT DOCUMENTS

| | | | |
|---|---|---|---|
| 2010/0289287 A1* | 11/2010 | Preti | B65G 47/847 |
| | | | 294/116 |
| 2016/0214803 A1* | 7/2016 | Armellin | B29C 49/36 |
| 2019/0176343 A1* | 6/2019 | Landler | B25J 15/0226 |
| 2021/0379733 A1* | 12/2021 | Ehrismann | B67C 3/242 |
| 2023/0159315 A1* | 5/2023 | Spandl | B67C 3/242 |
| | | | 248/313 |

FOREIGN PATENT DOCUMENTS

| | | |
|---|---|---|
| DE | 102016123640 B3 | 3/2018 |
| DE | 102018121092 A1 | 3/2020 |
| EP | 0 939 044 A1 | 9/1999 |
| EP | 1930259 A1 | 6/2008 |
| EP | 2 143 674 A2 | 1/2010 |

\* cited by examiner

CONTROL CAM FOR A CLAMPING DEVICE, AND CLAMPING DEVICE FOR HOLDING A CONTAINER

CROSS-REFERENCE TO RELATED APPLICATIONS

This application claims priority from German Patent Application No. DE 10 2021 131 002.4, filed on Nov. 25, 2021 in the German Patent and Trademark Office, the disclosure of which is incorporated herein by reference in its entirety.

BACKGROUND

Technical Field

The present invention concerns a control cam for controlling the position of clamping arms, pivotable relative to one another, of a clamping device, and a clamping device for holding a container in a container treatment device, for example for holding a beverage container at a neck portion in order to fill or close this inside a beverage filling plant.

Related Art

It is known, in beverage filling plants, to transport containers to be filled or already filled through the individual treatment stations of the container treatment device by means of clamping devices. Various clamping devices are known which hold the respective containers to be treated in various ways.

For example, passive clamping devices are known which are elastically pretensioned purely by insertion of the respective container in the clamping device, and which then hold the container. DE 10 2012 218 204 A1 describes such a clamp for gripping containers. The clamp has a fixed position. In order to grip a container, the latter must be pushed into the clamp. The stiff gripper arms are here spread open, so that the container must be moved against the closing force of the gripper arms resulting from spreading of the clamp. Thus the container is exposed to a high force on insertion, so such holding devices are not suitable for gripping or holding fragile and/or easily deformable and thin-walled containers. There is at least a tendency to scratch the surfaces of the respective container, which reduces the quality of the containers.

Furthermore, active clamping devices are known in which the respective holding portions of the clamping device are actively opened and closed by means of an actuator. Such active clamping devices serve in particular to allow secure and gentle receiving of the respective containers from a preceding clamping device, or also a safe and gentle transfer of the containers to a following clamping device. In particular, the active opening and closure of the respective clamping device may avoid increased friction on the respective container, which could for example lead to scratching of the container, and secondly a predefined holding or clamping force may be set which can be maintained within a predefined tolerance range of the container dimensions. Such active clamping devices consist of a plurality of individual components, for example clamping arms, bushes, spring elements, pretension elements and corresponding connecting elements for secure connection of the above-mentioned parts. Clamping devices constructed in this way are also complicated to clean and have a correspondingly high production cost.

EP 0 939 044 A1 discloses a bottle gripper in which a gripping device is provided having two gripping arms which can be brought into a holding position or a release position by means of a control cam. The control cam cooperates with a contact face formed on each gripper arm, and the contact face is configured as part of an elastic cushion arranged on the respective gripper arm.

EP 2 143 674 A2 describes a clamping device for holding containers, in which two gripper arms or clamping arms are held in an open position by separate magnetic arrangements. The clamping arms have closing levers oriented towards the rear, which cooperate with a closing cam arranged in between in order to bring the clamping arms from the open position into a closed position.

DE 10 2005 014 838 A1 discloses an active clamping device for holding vessels, with two clamping arms which are movable relative to one another for opening and closing. In order to allow secure holding of the vessels, one gripper arm of the clamp is designed to be form-stable and the other gripper arm is form-elastic. The gripper arms are pretensioned in an open position by means of magnets arranged thereon, and are pivoted into the closed position by means of a control cam.

The common feature of the conventional, unilaterally pretensioned clamping devices is that the control cam has precisely one contact face for each clamping arm, via which it touches the clamping arm. On pivoting of the control cam, the contact face of the control cam slides over the contact face both during opening and during closing of the clamping arms via the pivoting of the control cam with said precisely one contact face. In so doing, the control cam exerts a force on the clamping arms in the opposite direction to the pretension from the pretension device. The force applied by the control cam to the clamping arms always points in the same direction. For example, with an active clamping device pretensioned in the closed position, the control cam must apply to the clamping arms a force opposite the pretension, in order to open the clamping arms. Usually, for this the control cam is configured so that its contact face has an increasing radius or distance from the pivot axis of the control cam in the circumferential direction, or a cam form as shown in DE 10 2005 014 838 A1. With its contact face towards the clamping arm, the control cam slides along the clamping arm. Because of the increasing radius or distance from the clamping arm at the contact point, the clamping arm is pressed out of its pretensioned position and pivoted about its pivot axis. To close the clamping arms, the control cam is again pivoted so that its contact face slides back over the clamping arm. Because of the reducing distance of the region of the contact face by which the control cam is in contact with the clamping arm, the clamping arm is pressed back again by the pretension force.

In clamping devices with unilateral pretension of the clamping arms in one position, wherein said arms can be moved into another position against the pretension by actuation of the control cam, and by release or automatic switching of the control cam moved back into the one pretensioned position, the process of return movement under pretension carries a degree of inertia. Accordingly, the container may be suddenly gripped and suddenly released from its holder. Furthermore, in such active clamping devices, a great deal of wear can occur between the clamping arms and control cam, in particular its contact face, since the latter must always work against the unilaterally directed pretension.

SUMMARY

An improved clamping device for holding a container in a container treatment device, for example for holding a beverage container at a neck portion is described herein according to various embodiments.

Accordingly, a control cam is proposed for controlling the position of clamping arms which are pivotable relative to one another, comprising a shaft portion for pivotable mounting of the control cam about a control cam pivot axis, in a hub portion of a carrier plate of the clamping device, and at least one coupling element for coupling the control cam to a clamping arm of the clamping device, wherein the control cam is pivotable about the control cam pivot axis between a predefined open position and a predefined closed position.

According to the invention, the control cam is characterized in that the at least one coupling element has at least one first coupling face which extends in the direction of the control cam pivot axis and is designed and configured for transmitting a first switching force onto one of the clamping arms, and a second coupling face which is different from the first coupling face and extends in the direction of the control cam pivot axis, and is designed and configured for transmitting a second switching force, directed opposite the first switching force, onto the clamping arm.

Because the at least one coupling element has a first coupling face which extends in the direction of the control cam pivot axis and is designed and configured for transmitting a first switching force onto one of the clamping arms, and a second coupling face which is different from the first coupling face and extends in the direction of the control cam pivot axis, and is designed and configured for transmitting a second switching force, directed opposite the first switching force, onto the clamping arm, via the coupling element a permanent forced guidance of the clamping arms can be provided both during opening and during closing, and in one embodiment also a pretension of the clamping arms in at least one predefined position, in some embodiments in an open position or a closed position of the clamping arms or holding portions of the clamping arms.

In other words, because of the coupling provided by the coupling element, the position and a movement of the clamping arms are always predefined by the position and movement of the control cam. Accordingly, both opening of the clamping arms to receive the respective container to be treated, and closing of the clamping arms for holding the container and subsequent opening to discharge the previously held container, are each actively controlled and guided by the control cam.

Accordingly, it can be prevented that, on a switching pulse to the control cam generating an abrupt movement of the control cam, the clamping arms and control cam briefly come out of engagement or lose contact with one another, as may be the case with unilaterally pretensioned conventional clamping devices with conventional control cam, such as if the spring force of the unilateral pretension is not sufficient, and then hit one another again. The gripping and release of the container to be held by the clamping device may thus take place comparatively gently without any uncontrolled impacts occurring on opening or closing of the clamping arms.

Furthermore, because of the permanent guidance provided by the coupling element and a corresponding coupling element formed on the clamping arm, a defined contact of the holding portions on the container to be held may be achieved.

A clamping device having a control cam configured in this fashion may accordingly, in comparison with conventional devices, be subjected to particularly low wear during operation, in particular in regions in which the clamping arms and control cam are coupled, which in turn has a positive effect on the service life of the control cam and components of the clamping device.

With a container treatment device having a clamping device comprising the control cam, in comparison with container treatment devices with conventional clamping devices, the service intervals may be extended because of the reduced wear.

Furthermore, because of the constantly force-guided movement of the holding portions and the reduction, in comparison with conventional clamping devices, or even avoidance of the occurrence of impacts during opening and/or closing of the clamping arms, controlled by the control cam, damage of the container to be held and/or the escape of product present in the container, such as a beverage, with associated contamination of the clamping device and other regions of a container treatment device with the clamping device or the outside of the container, may be reduced or even avoided.

The expression "pivot axis" means a geometric axis representing a rotational centre point, and herein describes in particular a fixed pivot axis, also an axis arranged stationarily with respect to the clamping device. The term "pivot axis" does not therefore mean a floating axis in the sense of a momentary pole. A body moving simultaneously rotationally and translationally in a plane does not pivot about a fixed axis; accordingly it has no pivot axis as understood here.

The geometric pivot axis may evidently be provided or configured in the form of a mechanical axle or shaft in the known fashion. For example, an axle journal, a pin or a bolt may be arranged on a carrier plate of the clamping device, on which for example a clamping arm is pivotably mounted in the sense of a shaft-hub connection. In the present case, the control cam comprises the shaft portion which is rotationally mounted in a bore in the carrier plate, and thereby provides the geometric axis.

The term "opposite" here means that the first switching force and the second switching force each have a circumferential component relative to the control cam pivot axis, wherein the circumferential component of the first switching force and the circumferential component of the second switching force are oriented opposite one another or in opposite directions.

The clamping arms of the clamping device which are pivotable relative to one another in one or more embodiments each have a holding portion, wherein the holding portions, depending on operating state of the clamping device, cooperate to receive, hold and discharge the respective container to be treated.

According to a further embodiment, the coupling faces of the least one coupling element are arranged on the coupling element opposite one another with respect to the coupling element, in particular its contour or cross-sectional contour perpendicularly to the control cam pivot axis. According to a further embodiment, the at least one coupling element is configured in the form of a slotted groove, in several embodiments for receiving a control bolt arranged on a clamping arm, or in the form of a control bolt in various embodiments for penetration into a slotted groove arranged on a control arm. In a particularly advantageous fashion, then a permanent or persistent forced guidance of at least one clamping arm of the clamping device can be provided by the control cam.

A "slotted groove" here means a groove which has substantially the form of a slot, and extends in a longitudinal extent from a first end to a second end, and between the two ends has side walls running substantially parallel to one another, or in other words transversely to the longitudinal extent at a fixed distance from one another, in some embodiments running straight or having an infinite radius of curvature.

The longitudinal extent of the slotted groove is here related to a plane oriented perpendicularly to the control cam pivot axis. In other words, the slot shape of the slotted groove is evident viewed in the direction of the control cam pivot axis.

The slotted groove in the sense of a groove extends as a depression in a body with the above-described slot shape, in the direction of the control cam pivot axis, with a predefined depth and/or at least partially through the entire body.

If the control cam comprises at least one control bolt, in a further embodiment the at least one control bolt extends in the direction of the control cam pivot axis with a predefined height from an end face of the shaft portion.

If the control cam comprises at least one slotted groove, in a further embodiment, the at least one slotted groove extends in the direction of the control cam pivot axis with a predefined depth into the control cam from an end face of the shaft portion.

In order to achieve a particularly precise and synchronous control of the holding portions of the clamping arms of the clamping device, according to a further embodiment, two coupling elements are provided, wherein a respective coupling element is configured for coupling the control cam to a respective one of the two clamping arms of the clamping device, wherein in certain embodiments a first coupling element, for example a first control bolt or a first slotted groove, has a first distance from the control cam pivot axis, and a second coupling element, for example a second control bolt or a second slotted groove, has a second distance from the control cam pivot axis, wherein the amount of the second distance is in various embodiments greater than that of the first distance.

According to a further embodiment, the at least one coupling element, for example the at least one control bolt or the at least one slotted groove, is arranged eccentrically to the control cam pivot axis. Thus the coupling element, relative to the control cam pivot axis, always provides a lever arm which, on pivoting of the control cam, always exerts a force on at least one clamping arm via its coupling to the corresponding coupling element on the clamping arm, in order to control the movement of the clamping arm, and/or on a holding force exerted on the container, held in the clamping device, via the holding portion of the clamping arm.

According to a further embodiment, the at least one control bolt comprises a portion which is curved, in one or more embodiments an arcuate portion, relative to a longitudinal centre axis of the control bolt which is oriented in various embodiments parallel to the control cam pivot axis.

Alternatively or in addition, the at least one control bolt may have a cam portion which extends in a plane oriented perpendicularly to the control cam pivot axis.

In several embodiments, at least one coupling face is arranged in the curved portion and/or in the cam portion.

If, according to a further embodiment, two control bolts are provided, the control bolts may be connected by a connecting wall, which in some embodiments may mean two interconnected cam portions, wherein a control bolt is assigned to each cam portion.

According to a further embodiment, the control cam comprises a radial locking groove for receiving a fixing element, for example a fitting key or a locking plate, in order to fix the control cam axially relative to the control cam pivot axis.

Alternatively or additionally, the at least one control bolt, viewed in the direction of the control cam pivot axis, at its free end opposite an end face of the shaft portion, has a locking web for axially securing the control cam to the clamping device.

In certain embodiments, the locking web is configured in the form of a in one embodiment circular flange which is arranged concentrically or eccentrically to the longitudinal centre axis of the control bolt, and the outer diameter of which is in various embodiments greater than a radius of an arcuate portion of the control bolt and/or in some embodiments greater than a width of the slotted groove provided on the clamping arm of the clamping device, transversely to its longitudinal extent.

According to a further embodiment, the control cam has an interaction part extending radially outward relative to the control cam pivot axis, for interaction with an interaction bolt of a container treatment device, wherein the interaction part is configured to limit a scope of movement of the control cam about the control cam pivot axis, wherein the interaction part is in some embodiments configured to cooperate with a stop of the clamping device, wherein the control cam in several embodiments has two arms extending radially outward relative to the control cam pivot axis.

According to a further embodiment, the control cam comprises a pretension element which is configured to interact with a stop element of the clamping device so that the control cam is pretensioned in the predefined open position when the control cam is in the predefined open position, and is pretensioned in the predefined closed position when the control cam is in the predefined closed position.

It has proved advantageous if, according to a further embodiment, the pretension element is configured as an elastic pretension element and/or as a magnetic pretension element.

According to a further embodiment, the pretension element comprises an elastic spring element, wherein the spring element has a curvature relative to the control cam pivot axis which is greater than a curvature of the geometric pitch circle, arranged concentrically to the control cam pivot axis, at the level of the spring element.

According to a further embodiment, the pretension element comprises a web extending radially outwardly relative to a geometric pitch circle arranged concentrically to the control cam pivot axis, and a spring element extending from the web transversely to the radial direction relative to the control cam pivot axis. In several embodiments a respective spring element extends on each side of the web relative to the control cam pivot axis. The at least one spring element is in various embodiments configured such that a distance is present between a free end of the spring element and an arm lying opposite the end of the spring element, so as to provide a receiver for receiving by form fit a running roller of the clamping device in the circumferential direction relative to the control cam pivot axis.

It has proved particularly suitable if, according to a further embodiment, the at least one spring element is configured as a curved leaf spring, in the form of a bolt spring-mounted radially relative to the control cam pivot axis, or in the form of a bending bar with a free end.

According to a further embodiment, the pretension element is configured in the form of a magnetic pretension element, wherein the magnetic pretension element comprises at least one magnetic element provided on an arm, wherein the magnetic pretension element in some embodiments comprises two magnetic elements each arranged in an arm, wherein the at least one magnetic element is arranged and configured so as to cooperate with a magnet of the clamping device when the control cam is fitted in the clamping device, such that a magnetic attraction force is present between the magnet and the magnetic element, at least when the control cam is in the predefined closed position and/or when the control cam is in the predefined open position.

Further advantageous embodiments and further advantageous effects can are given in the following description of exemplary embodiments.

A clamping device for holding a container in a container treatment device, for example for holding a beverage container at a neck portion is also described herein according to various embodiments.

Accordingly, a clamping device is proposed for holding a container in a container treatment device, for example for holding a beverage container at a neck portion, comprising two clamping arms with a holding portion for holding the container to be held. The clamping device is characterized in that the clamping arms are coupled to a control cam according to any of the preceding embodiments.

Because the clamping device has a control cam according to any of the preceding embodiments, the advantages and effects described above and below with respect to the control cam apply accordingly to the clamping device.

BRIEF DESCRIPTION OF THE FIGURES

Further embodiments of the invention are explained in more detail by way of the description of the figures that follows.

DETAILED DESCRIPTION

Exemplary embodiments are described below with reference to the figures. In this case, elements that are identical, similar or have the same effect are provided with identical reference signs in the various figures and a repeated description of these elements is partly omitted in order to prevent redundancies.

Figure 1:
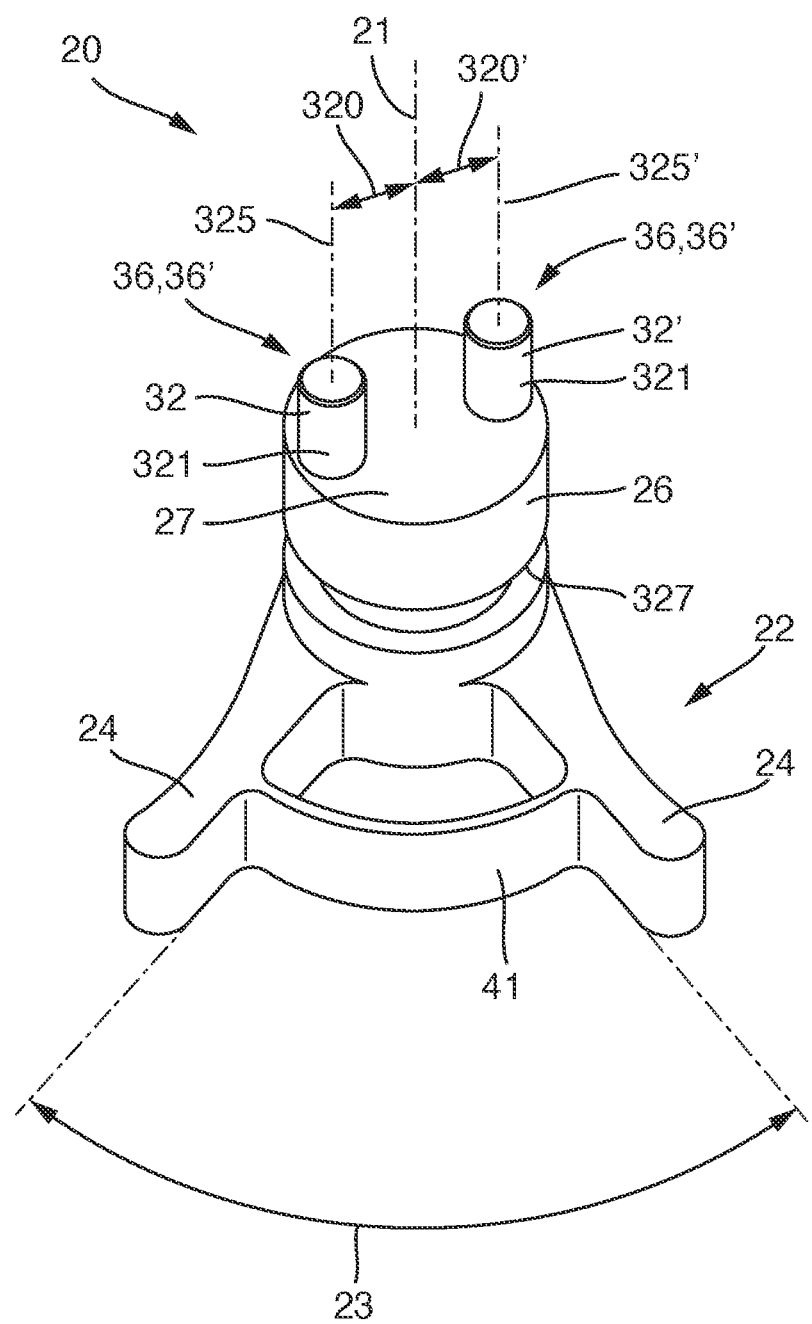
FIG. 1 shows schematically a perspective side view of a control cam for controlling the position of clamping arms, pivotable relative to one another, each having a holding portion, in a clamping device.
Figure 10:
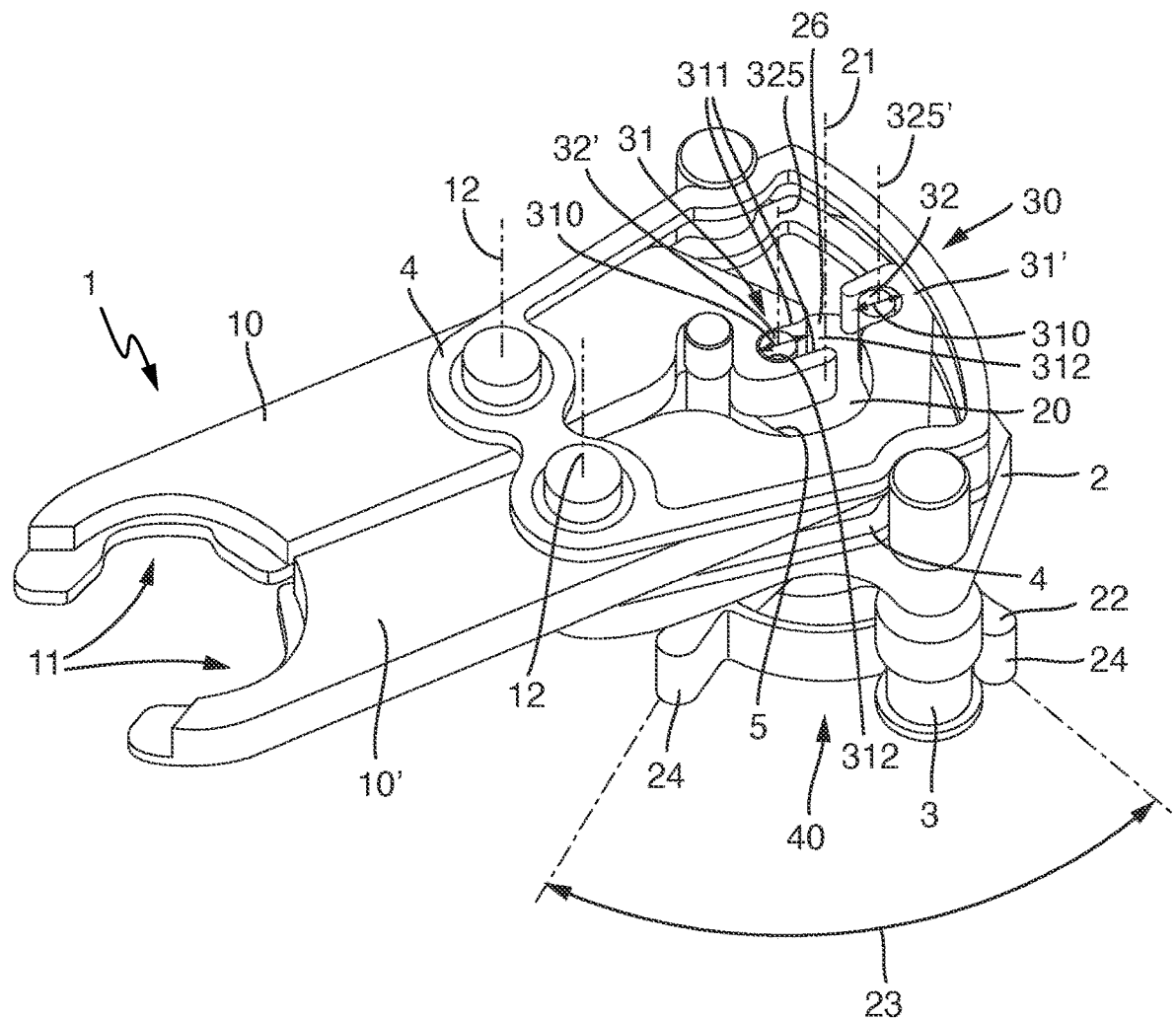
FIG. 10 shows schematically a perspective side view of a clamping device for holding a beverage container at a neck portion.

FIG. 1 shows schematically a perspective side view of a control cam 20 for controlling the position of clamping arms 10, pivotable relative to one another, each having a holding portion 11, in a clamping device 1 (see also FIG. 10). The control cam 20 comprises a shaft portion 26 for pivotable mounting of the control cam 20 about a control cam pivot axis 21, in a hub portion 5 (not shown here) of a carrier plate 2 of the clamping device 1. It furthermore comprises two elements for coupling the control cam 20 to the clamping arms 10 of the clamping device 1. The coupling elements in the present case are each configured as a control bolt 32, 32' arranged eccentrically to the control cam pivot axis 21.

The control bolts 32, 32' extend from an end face 27 of the shaft portion 26 in the direction of the control cam pivot axis 21. Accordingly, they each have a respective longitudinal centre axis 325, 325' which is oriented parallel to the control cam pivot axis 21.

The control bolts 32, 32' are each configured and designed to interact with a respective slotted groove 31 (see FIG. 10) arranged on the clamping arm 10 to be controlled by the control bolt 32, 32', or to form a coupling therewith. The coupling is configured such that the respective control bolt 32, 32' is guided in its assigned slotted groove 31, in some embodiments in that it can move translationally along the slotted groove 31 or along a longitudinal extent 310 of the slotted groove 31 which extends perpendicularly to the control cam pivot axis 21, and can in various embodiments move rotationally relative to the slotted groove 31, for example via rolling on and/or sliding over a side wall 311 of the slotted groove 31.

Alternatively, the control cam 20 may also have coupling elements in the form of a slotted groove 31, as explained in more detail below with reference to FIGS. 22 to 24. Accordingly, the slotted groove 31 then extends in the direction of the control cam pivot axis 21 with a predefined depth into the control cam from the end face 27 of the control cam 20. Furthermore, the slotted groove 31 is configured to receive a control bolt 32 assigned to the slotted groove 31 and arranged on the clamping arm 10 to be controlled, and thereby provide a guidance for the control bolt 32 along the longitudinal extent 310 of the slotted groove 31, in several embodiments translationally and rotationally, as described above with respect to the control bolt 32, 32' according to FIG. 1.

In the embodiment shown in FIG. 1, the first control bolt 32 has a radial distance 320 from the control cam pivot axis 21 which is smaller by a predefined amount than the radial distance 320' of the second control bolt 32' from the control cam pivot axis 21. The distances 320, 320' here relate to the centre longitudinal axes 325, 325'.

Because the control bolts 32, 32' are arranged at different radial distances 320, 320' from the control cam pivot axis 21, a symmetrical pivoting of the two clamping arms 10 of the clamping device 1 having the control cam 20 can be achieved, even if the distances between the pivot axes 12 of the clamping arm 10 and slotted groove 31, 31' differ with respect to the two clamping arms 10, 10'. The above-mentioned distances 320, 320' are in one or more embodiments selected such that the translational ratio provided by the first pair of the first slotted groove and first control bolt corresponds substantially to the translational ratio provided by the second pair of second slotted groove and second control bolt.

The centre longitudinal axes 325, 325' are the centre axes relative to the cylindrical side wall of the respective control bolt 32, 32'. The cylindrical side wall or, synonymously, the casing surface corresponds to an arcuate portion 321 of the control bolt 32, 32' extending along the entire circumference.

In the state arranged on the clamping device 1, the control cam 20 may be pivoted about its control cam pivot axis 21 between a predefined open position and a predefined closed position by pivoting about said control cam pivot axis 21.

In order to fix the control cam 20, axially relative to the control cam pivot axis 21, in a fixed position in the clamping device, the control cam 20 optionally comprises a radial locking groove 327 for receiving a fixing element, e.g. a fitting key or a locking plate, which is in some embodiments arranged on the carrier plate 2 of the clamping device 1.

In order to be able to change the position of the control cam 20 when the clamping device 1 is installed on a container transport device of a container treatment device, said control cam has an interaction part 22 which extends radially outward relative to the control cam pivot axis 21, and on which for example an interaction bolt, provided at a fixed position of the container treatment device, can stop and thus cause a pivoting of the control cam 20.

In order to limit the movement scope of the control cam 20 about the control cam pivot axis 21, the interaction part 22 may be configured to cooperate with an optional stop of the clamping device in various embodiments arranged on the carrier plate 2. In an exemplary embodiment, the control cam 20 to this end comprises two arms 24 which extend radially outward relative to the control cam pivot axis 21 when viewed in the circumferential direction, and which are in some embodiments configured to stop on the stop arranged between the arms 24, or two stops arranged radially outside the arms 24, in an end position. Thus, in the state installed in the clamping device 1, the control cam 20 can pivot about the control cam pivot axis 21 only through an angle 23 delimited by the arms 24, in particular by the interaction with the at least one stop 3, which angle in this case is 45°. The end positions of the control cam 20, at which one of the arms 24 of the control cam 20 lies on the stop 3, here constitute predefined positions with respect to the open and closed positions of the holding portions of the clamping arms 10 of the clamping device 1. One end position accordingly constitutes a predefined open position, and the other end position constitutes a predefined closed position.

The control cam 20 furthermore comprises a pretension element, in the present case in the form of an elastic spring element 41, which is configured to interact with a stop element of the clamping device 1 so that the control cam 20 is pretensioned in the predefined open position when the control cam 20 is in the predefined open position, and is pretensioned in the predefined closed position when the control cam 20 is in the predefined closed position.

The control cam 20 is in one embodiment configured as one piece, or integrally. The control cam 20 is in some embodiments made from a metal, for example a steel alloy. Alternatively, the control cam may be made from in certain embodiments a polyoxymethylene (POM), and/or parts of the control cam 20, for example the control bolt 32, the slotted grooves 31 and/or the shaft portion 26, may be provided with a coating, in some embodiments a slide coating and/or a wear coating. In several embodiments, the control cam 20 is made from a material different from the carrier plate 2 and/or the clamping arms 10, for example a metal with a different hardness, or a plastic.

The arms 24 and the control bolts 32, 32' are configured such that a lever arm ratio between a lever arm present between the control cam pivot axis 21 and a predefined attack point for an interaction element of the container treatment device for switching the control cam 20, and the lever arms present between the control bolts 32, 32' and the control cam pivot axis 21, lies substantially between 5:1 and 3:1, and in certain embodiments is substantially 4:1. The term "substantially" here means that differences resulting from the different distances 320, 320' lie within the rounding or tolerance of the lever arm ratio. In other words, the difference between distances 320, 320' is sufficiently small that the resulting differences from the above-described lever arms may be ignored.

As described in more detail below with reference to FIGS. 26 and 27, each of the coupling elements of the control cam 20, here in the form of control bolts 32, 32', for achieving the permanent forced guidance of the control arms 10 by the control cam 20 provided via the coupling of the coupling elements of the control cam 20 with the clamping arms 10, in each case comprises a first coupling face 36 extending in the direction of the control cam pivot axis 21 and designed and configured for transmitting a first switching force to the clamping arms 10, and a second coupling face 36 different from the first coupling face 36, extending in the direction of the control cam pivot axis 21 and designed and configured for transmitting a second switching force, opposite the first switching force, onto the clamping arm 10 (for details, see FIGS. 26 and 27).

Figure 2:
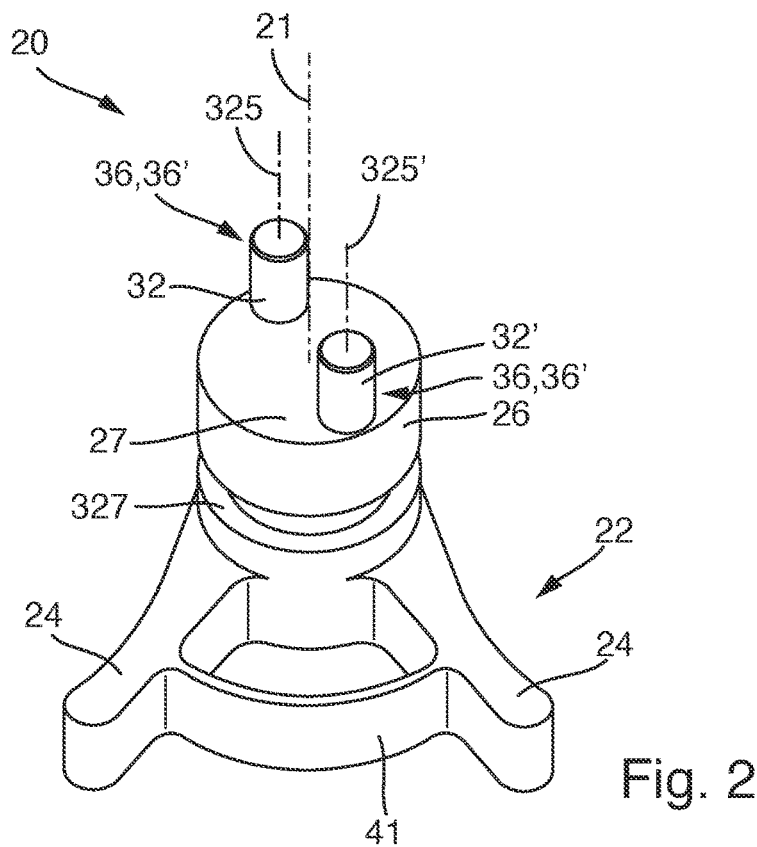
FIG. 2 shows schematically a perspective side view of a control cam according to a further embodiment.

FIG. 2 shows schematically a perspective side view of a control cam 20 according to a further embodiment, which substantially corresponds to that of FIG. 1. Only the control bolts 32, 32' and the interaction part 22, and the arms 24, have a different orientation to one another.

Figure 11:
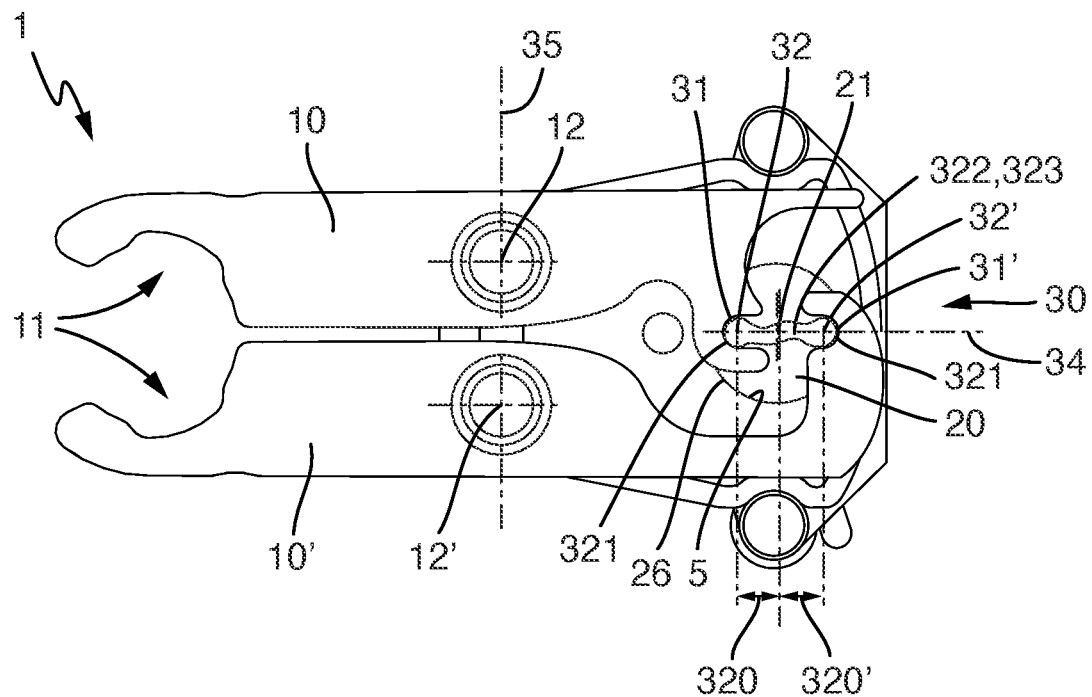
FIG. 11 shows schematically a top view of a clamping device according to a further embodiment, in a closed position.
Figure 12:
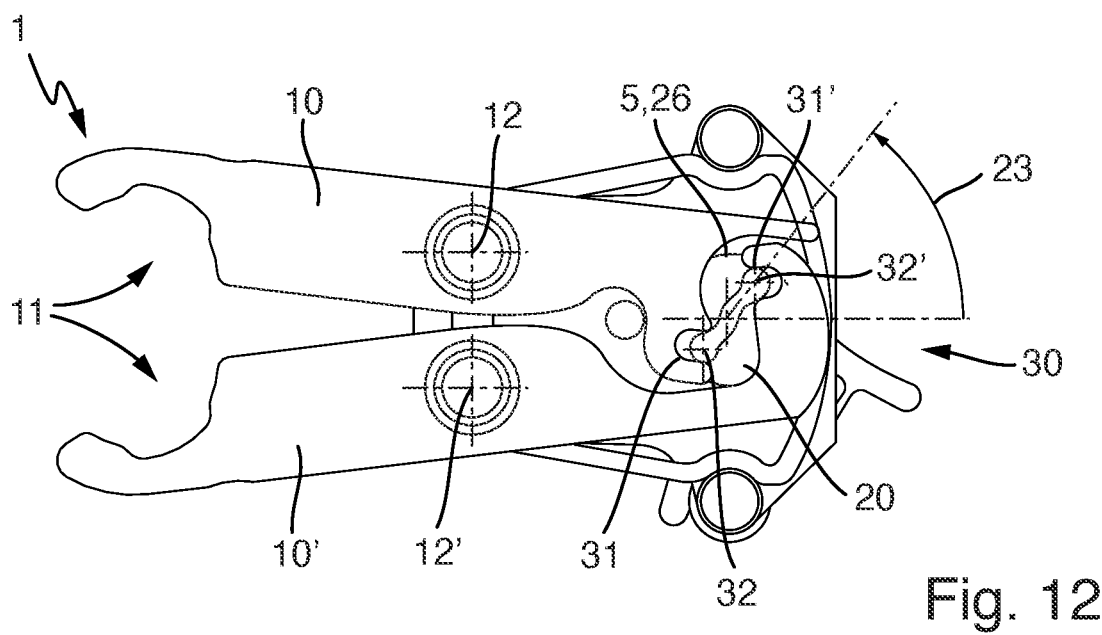
FIG. 12 shows schematically a top view of a clamping device from FIG. 11 in an open position.

The orientation of the coupling elements—in FIGS. 1 and 2, the control bolts 32, 32'—with respect to the interaction part 22 or the arms 24 is in some embodiments predefined such that in a predefined closed position, the control bolts 32, 32' are oriented perpendicularly to a plane defined by the pivot axes of the clamping arms (see also FIG. 11) or parallel to this plane (see also FIG. 12).

Figure 3:
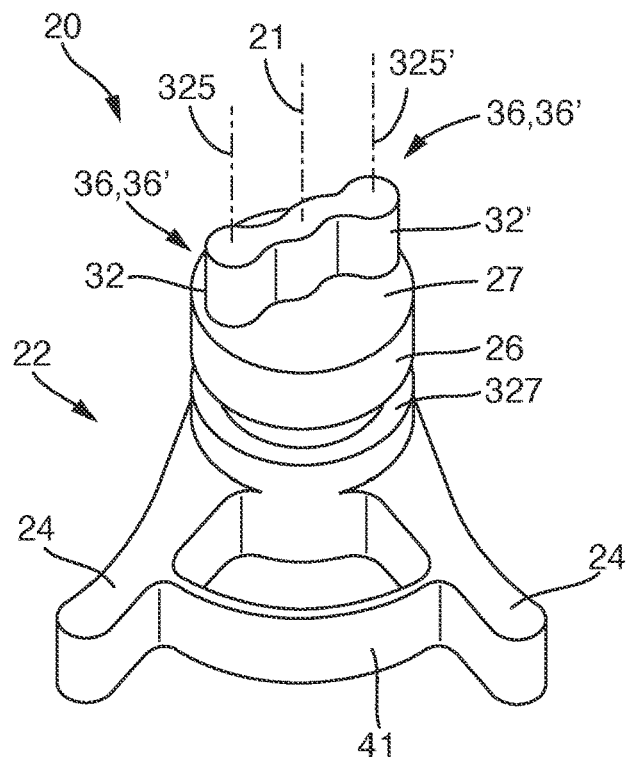
FIG. 3 shows schematically a perspective side view of a control cam according to a further embodiment.

FIG. 3 shows schematically a perspective side view of a control cam 20 according to a further embodiment. This substantially corresponds to that of FIG. 1. In contrast to the embodiment of FIG. 1, in the embodiment of FIG. 3, the control bolts 32, 32' are connected by a connecting wall 324 which may be understood as two interconnected cam portions 322. In addition or alternatively to the optional stop 3 (see FIG. 10), the movement of the control cam 20 about the control cam pivot axis 21 may thereby be limited. Since the control bolts 32, 32' are connected via the connecting wall 324, with respect to the control cam pivot axis 21, they have an increased bending stiffness in the radial direction in comparison with the embodiment of FIG. 1.

Figure 4:
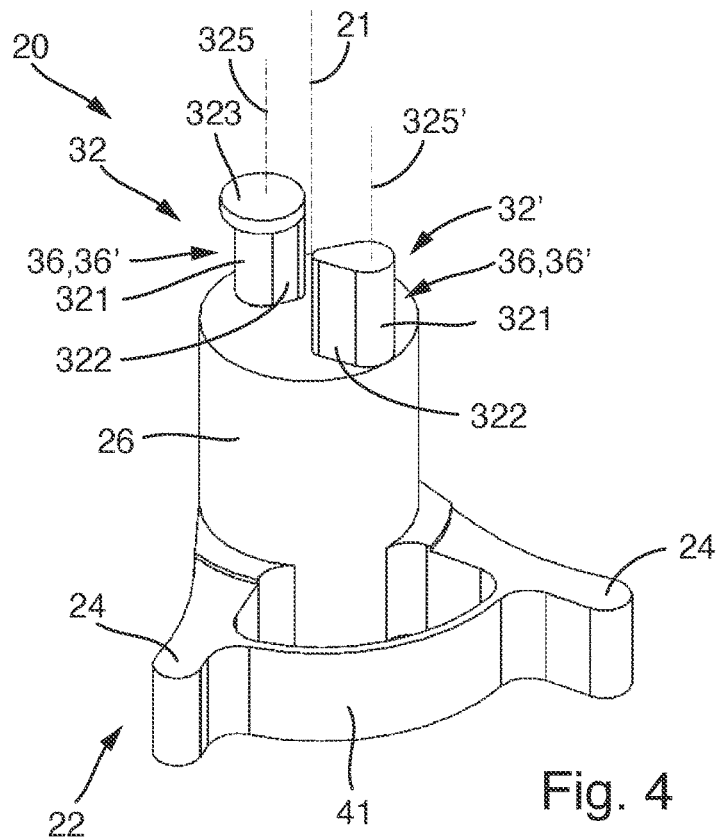
FIG. 4 shows schematically a perspective side view of a control cam according to a further embodiment.

FIG. 4 shows schematically a perspective side view of a control cam 20 according to a further embodiment, which substantially corresponds to that of FIG. 2.

In the clamping device 1 according to FIG. 4, in contrast to the embodiment of FIG. 1, the control bolts 32, 32' each have a cam portion 322. In addition or alternatively to the optional stop 3 (see FIG. 10), the movement of the control cam 20 about the control cam pivot axis 21 may thereby be limited.

Figure 15:
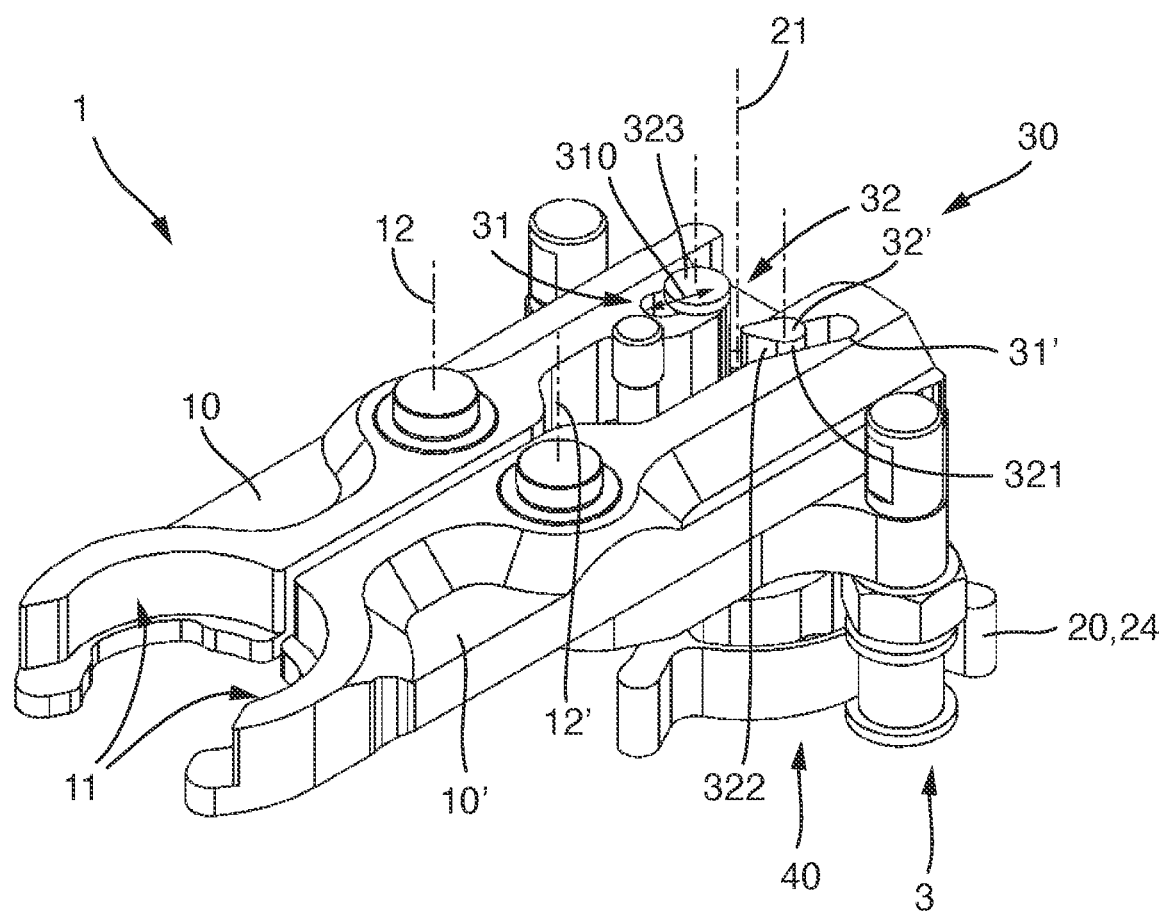
FIG. 15 shows schematically a perspective side view of a clamping device according to a further embodiment.

Furthermore, at its free end face opposite the end face 27 viewed in the direction of the control cam pivot axis 21, the control bolt 32 has a locking web 323, in this case configured as a circular flange which is arranged concentrically to the longitudinal centre axis 325 of the control 32 and the outer diameter of which is greater than the radius of the arcuate portion 321, and furthermore greater than the width of the slotted groove 31 transversely to its longitudinal extent 310 (see also FIG. 15). Thus in the direction of the control cam pivot axis 21, a form fit is created between the clamping arm 10 and the control cam 20 so that in the state shown in FIG. 15, not arranged on a container transport device, the control cam 20 is held on the clamping arm 10.

Accordingly, with the control cam 20 shown in FIG. 4, no locking groove 327 is required (see FIGS. 1-3), so this has been omitted here.

Figure 5:
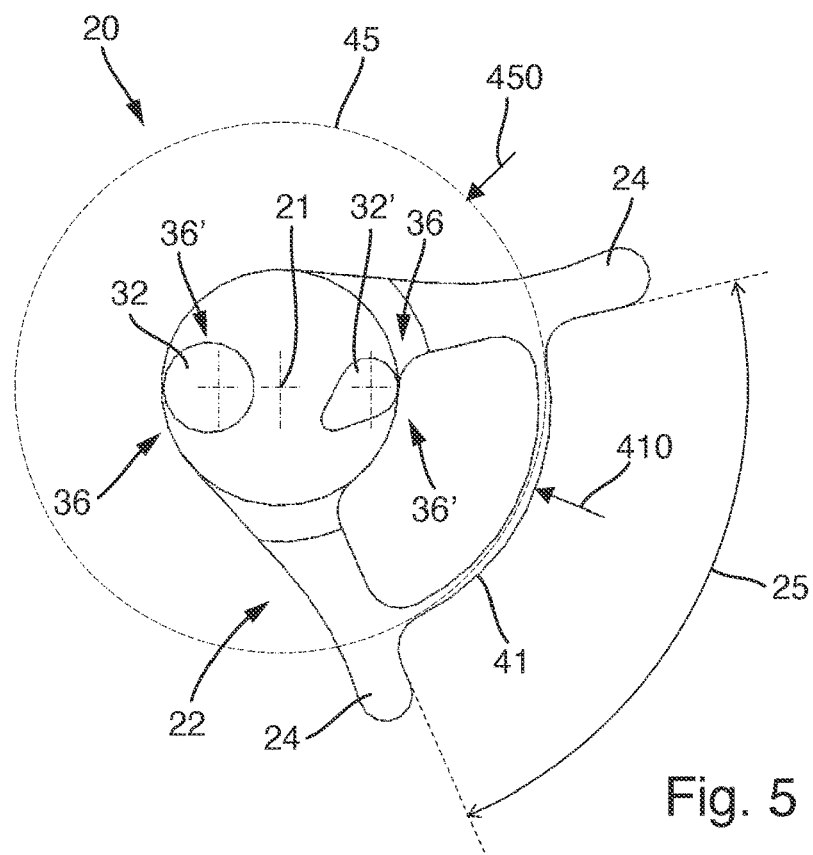
FIG. 5 shows schematically a top view of the control cam from FIG. 4.

FIG. 5 shows schematically a top view of the control cam 20 from FIG. 4, with reference to which the pretension element is described in more detail, wherein as already stated with respect to FIG. 1, in this embodiment the pretension element takes the form of a spring element 41, in the present case a curved leaf spring which extends between the arms 24 substantially in the circumferential direction with respect to the control cam pivot axis 21. As shown in FIG. 5, on its radially outer side, the spring element 41 has a curvature indicated by the curvature radius 410 which is greater than a curvature, indicated by the radius 450, of a geometric pitch circle 45 present concentrically to the control cam pivot axis 21, at the level of the connecting points of the spring element 41 to the arms 24 of the interaction part 22.

The interaction of the pretension element with the stop 3 of the clamping device 1 is described in more detail below with reference to FIGS. 16 and 17.

Reference symbol 25 indicates the extent angle of the interaction portion 22 or the arms 24 in the circumferential direction relative to the control cam pivot axis 21, which angle in this case is 45°.

Figure 6:
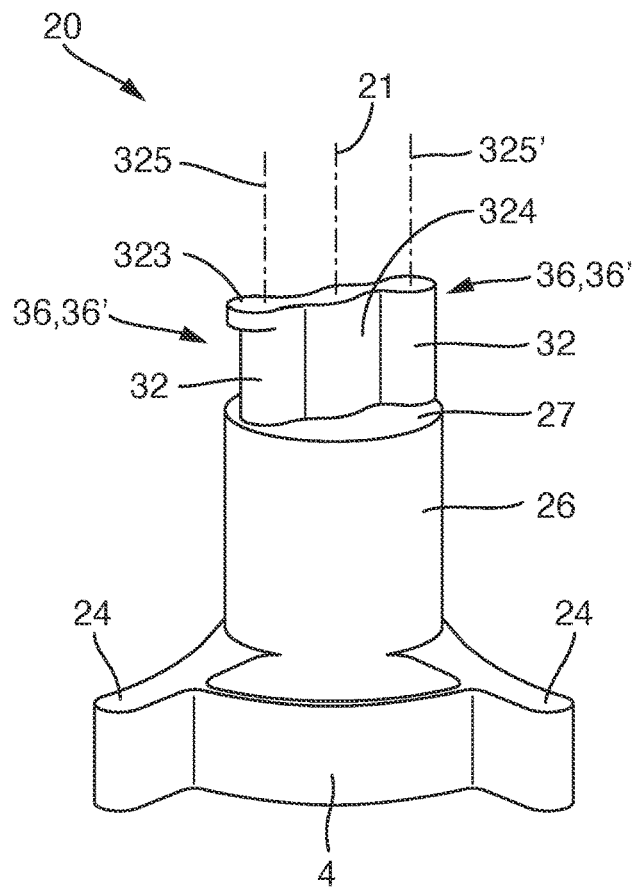
FIG. 6 shows schematically a perspective side view of a control cam according to a further embodiment.

FIG. 6 shows schematically a perspective side view of a control cam 20 according to a further embodiment, which substantially corresponds to the embodiment of FIG. 3, wherein the control bolt 32 furthermore comprises a locking web 323 according to FIG. 4 and accordingly no radial locking groove is provided.

Figure 7:
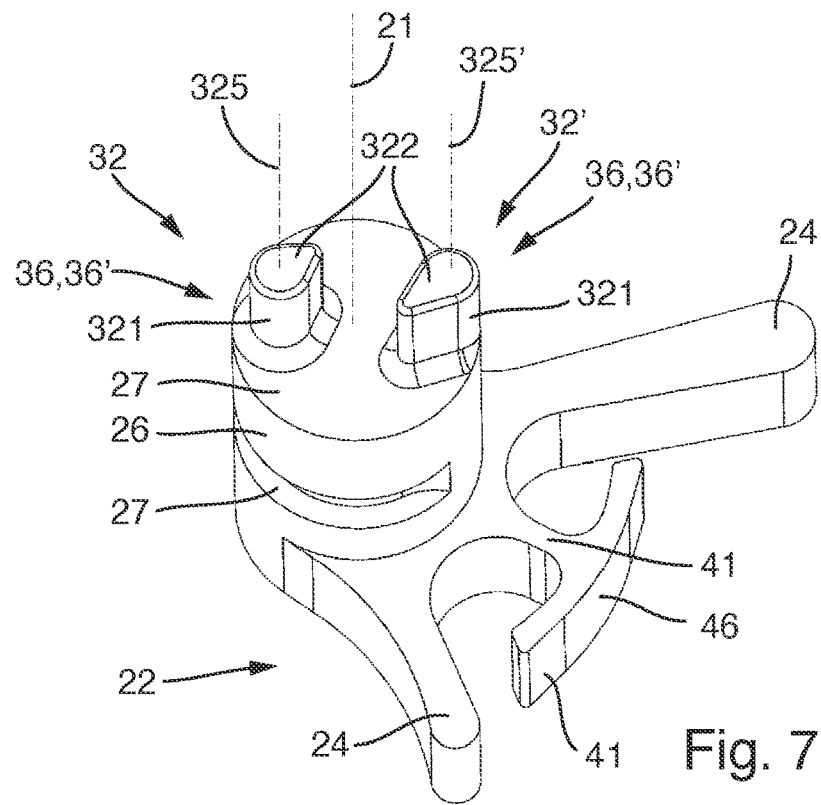
FIG. 7 shows schematically a perspective side view of a control cam according to a further embodiment.
Figure 8:
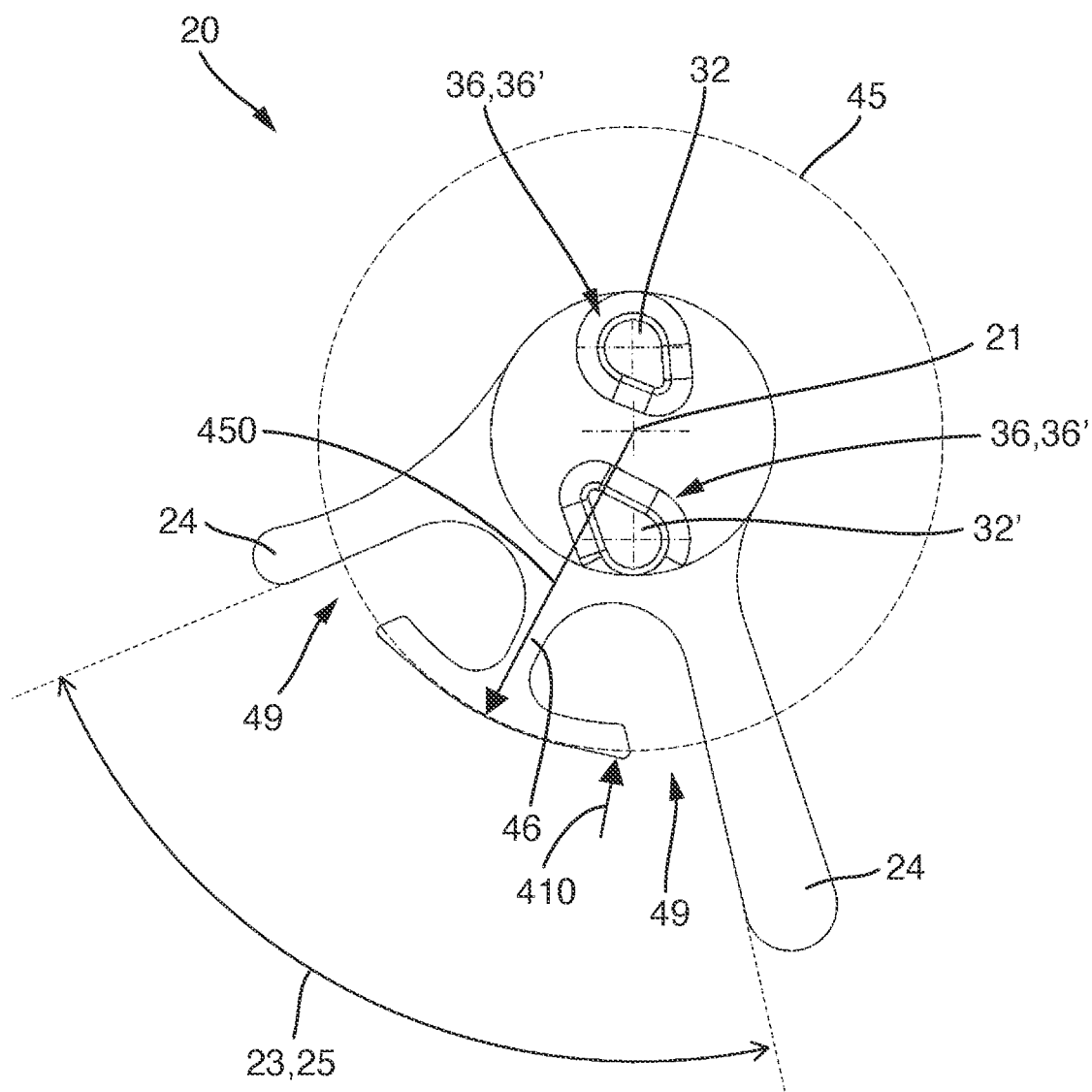
FIG. 8 shows schematically a top view of the control cam from FIG. 7.

FIG. 7 shows schematically a perspective side view of a control cam 20 according to a further embodiment, which is illustrated schematically in a top view in FIG. 8. The control cam 20 corresponds substantially to that in FIG. 2, wherein the control bolts 32, 32' each comprise a cam portion 322 in addition to their arcuate portion 321. Furthermore, the control cam 20 has a pretension element which differs from the embodiments of FIGS. 1 to 6.

Instead of the continuous leaf spring which is attached to or transforms into the arms 24 at both ends, the control cam 20 in this embodiment comprises a pretension element which is formed from a web 46 extending substantially centrally between the arms 24 radially outward to the pitch circle 45, and spring elements 41 which at the radially outer end of the web 46 extend substantially in the circumferential direction or tangentially with respect to the control cam pivot axis 21, on both sides of the web 46, in the form of a bending bar with free end, wherein the free end in each case ends at a predefined distance from the respective arm 24.

The spring element 41 have a curvature which is smaller than the curvature of the pitch circle 45. In other words, the curvature radius 410 of the spring element 41 relative to the control cam pivot axis 21 is greater than the radius 450 of the pitch circle 45, at the level of which the web 46 ends.

Accordingly, the free ends 411 lie radially further out than the pitch circle 45 with respect to the control cam pivot axis 21.

Figure 18:
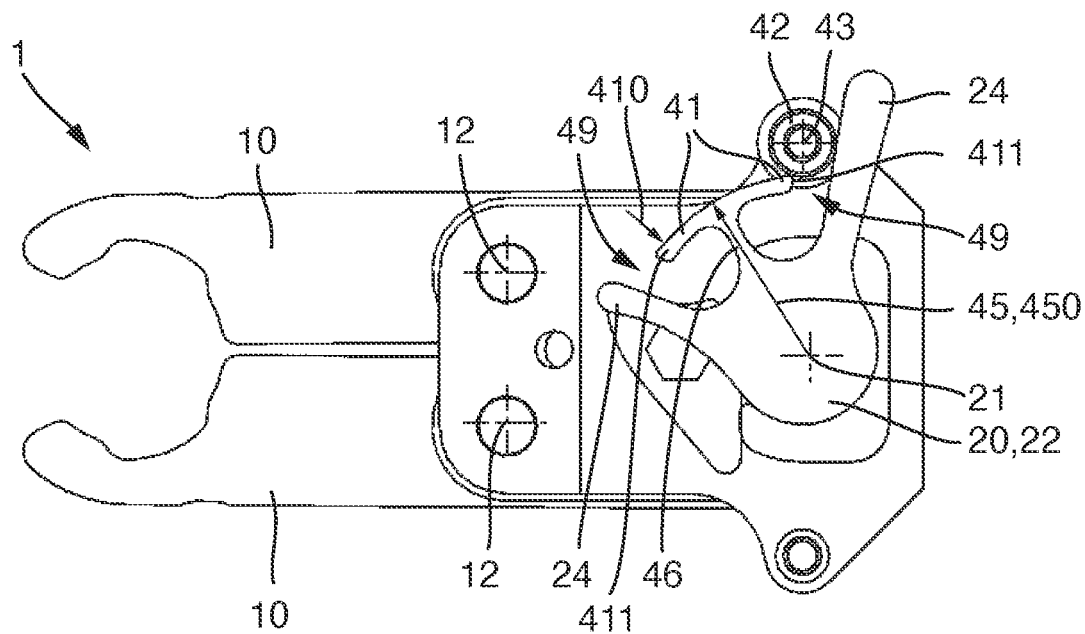
FIG. 18 shows schematically a view from below of a clamping device according to a further embodiment.

Because there is a distance on both sides of the web 46 between the free end 411 there and the respective arm 24, a receiver 49 is formed for receiving by form fit, viewed in the circumferential direction relative to the control cam pivot axis 21, a running roller 42 of the clamping device 1 in the respective end position (see also FIG. 18).

The spring elements 41 are here configured such that they are elastically bent by a predefined amount by the running roller 42 situated in the receiver 49. In this way, they provide a pretension force on the running roller 42 which pretensions the running roller 42 and hence the control cam 20 into the respective end position.

Figure 9:
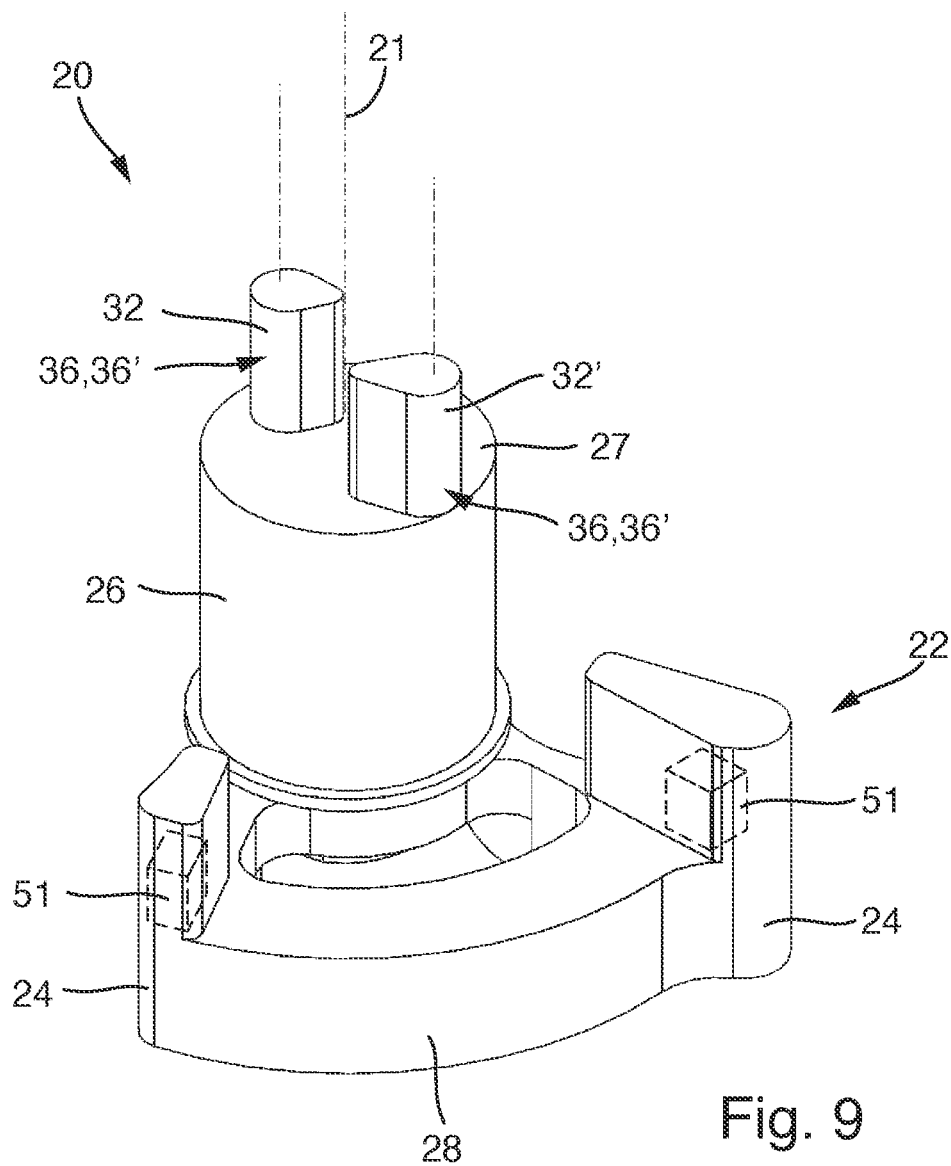
FIG. 9 shows schematically a further embodiment of a control cam.

FIG. 9 shows schematically a further embodiment of a control cam 20 which corresponds substantially to that of FIGS. 7 and 8, wherein here the pretension element is configured as a magnetic pretension element.

The magnetic pretension element comprises two magnetic elements 51 arranged one in each of the arms 24.

The magnetic elements 51 are designed and arranged such that, in a state of the control cam 20 installed in the clamping device 1, they cooperate with a magnet 50 of the stop 3 of the clamping device 1 (see also FIG. 21) such that a magnetic attraction force is present between the magnet 50 and the respective magnetic element 51 when the control cam 20 is in one of the end positions.

Instead of the magnetic element 51, magnetisable or ferromagnetic bodies may be provided in the arms 24, or the arms 24 themselves may comprise a magnetisable or ferromagnetic material. It is furthermore possible to replace the magnets 50 with a magnetisable or ferromagnetic material, insofar as magnetic elements 51 generating a magnetic field are present in the arms 24.

Furthermore, in some embodiments, a circle segment-shaped connecting bar 28 extends between the arms 24. This may be designed, like the arms 24, to cooperate with a magnet 50 of the stop 3, such that a magnetic attraction force is present between the connecting bar 28, at least a magnetisable or ferromagnetic body or magnetic element (not shown) provided in the connecting bar 28, and the stop 3. The control cam 20 in the clamping device 1 may thus be held at a fixed position axially relative to the control cam pivot axis 21, without the need for form-fit elements such as the locking groove 327 or locking web 323.

FIG. 10 shows schematically a perspective side view of a clamping device 1 for holding a beverage container at a neck portion. The clamping device comprises two clamping arms 10, 10' with a holding portion 11 for holding the container to be held. The holding portion 11 is configured for example to grip a container to be held below a neck ring of the container. The clamping arms 10, 10' are arranged on a carrier plate 2 so as to be pivotable about a respective pivot axis 12 for opening and closing. The pivot axes 12 are oriented parallel to one another.

The clamping device 1 furthermore comprises a control cam 20 according to FIG. 1 which is pivotable about a control cam pivot axis 21 oriented parallel to the pivot axes 12. To predefine the position of the holding portions 11 of the clamping arms 10, 10', the clamping arms 10, 10' and the control cam 20 are coupled, in the present case via a coupling mechanism 30 described in more detail below. Because of the coupling, a pivoting of the control cam 20 about its control cam pivot axis 21 causes a pivoting of the clamping arms 10 about their pivot axes 12, so that the holding portions 11 can be moved relative to one another, towards one another or away from one another, in order to open and close the clamping device 1. In other words, the relative movement of the holding portions 11 is controlled by the control cam 20.

In the present case, the coupling mechanism 30 is formed from or comprises two pairs of a respective slotted groove 31, 31' and the control bolt 32, 32' guided in the slotted groove 31, 31', wherein a respective pair of slotted groove 31, 31' and control bolt 32, 32' couples a clamping arm 10, 10' to the control cam 20.

In the present case, this coupling is provided in that each clamping arm 10, 10' has a coupling element in the form of a slotted groove 31, 31', in which the control bolt 32, 32' assigned to said slotted groove 31, 31' and arranged on the control cam 20 is guided, which bolt constitutes a coupling element of the control cam 20 corresponding to the coupling element of the clamping arm 10, 10'.

The "guiding" of the control bolt 32, 32' in the assigned slotted groove 31, 31' is configured such that the control bolt 32, 32' can move translationally relative to the slotted groove 31, 31' in a plane extending parallel to the control cam pivot axis 21, and can roll and/or slide along the side walls of the slotted groove 31, 31', or also move rotationally relative to the slotted groove 31, 31'.

The slotted grooves 31, 31' each extend completely through the clamping arm 10, 10' in the direction of the control cam pivot axis 21. They may also be regarded as continuous holes in slot form.

Viewed in the direction of the control cam pivot axis 21, the slotted grooves 31, 31' each have substantially the form of a slot. Accordingly, in a longitudinal extent 310 oriented perpendicularly to the control cam pivot axis 21, they extend from a first end 312 to a second end 312, with side walls 311 running substantially parallel to one another between the two ends 312.

In the present case, the slotted grooves 31, 31' are each formed open at one end. In other words, one of the two ends 312 is an open end. In the present case, the open end 312 of each slotted groove 31, 31' is the end 312 lying closer to the control cam pivot axis 21.

In order to be able to change the position of the control cam 20 when installed on a container transport device of a container treatment device, said control cam has an interaction part 22 which extends radially outward relative to the control cam pivot axis 21, and on which for example an interaction bolt, provided at a fixed position of the container treatment device, can stop and thus cause a pivoting of the control cam 20.

In order to limit the scope of movement of the control cam 20 about the control cam pivot axis 21, the clamping device 1 furthermore comprises an optional stop 3 which is arranged on the carrier plate 2 and which, viewed in the circumferential direction relative to the control cam pivot axis 21, is arranged between two radially outwardly extending arms 24 of the control cam 20. Thus the control cam 20 can pivot about the control cam pivot axis 21 only through an angle 23 delimited by the arms 24, in the present case 45°. The end positions of the control cam, at which one of the arms 24 of the control cam 20 lies on the stop 3, here constitute predefined positions with respect to the open and closed positions of the holding portions 11. One end position accordingly constitutes a predefined open position, and the other end position constitutes a predefined closed position.

The holding portions 11 may accordingly be moved by pivoting of the control cam 20 between a closed position predefined by the predefined closed position, shown in FIG. 1, and an open position predefined by the predefined open position.

The clamping device 1 furthermore comprises a pretension device 40 holding or pretensioning the control cam 21 in a predefined position, in the predefined closed position or predefined open position, as will be explained in more detail below.

The arms 24 and the control bolts 32, 32' are configured such that a lever arm ratio between a lever arm present between the control cam pivot axis 21 and a predefined attack point for an interaction element of the container treatment device for switching the control cam 20, and the lever arms present between the control bolts 32, 32' and the control cam pivot axis 21, lies substantially between 5:1 and 3:1, and in some embodiments is substantially 4:1. The term "substantially" here means that differences resulting from the different distances 320, 320' lie within the rounding or tolerance of the lever arm ratio. In other words, the difference between distances 320, 320' is sufficiently small that the resulting differences from the above-described lever arms may be ignored.

A sliding plate 4 is provided between the carrier plate 2 and the clamping arms 10, and provides a slide bearing of the clamping arms 10 relative to the carrier plate 2.

Furthermore, a sliding plate 4 is provided above the clamping arms 10 and provides a slide bearing of the clamping arms 10 relative to a container transport device on which the clamping device 1 may be arranged.

The clamping arms 10 and/or the carrier plate 2 may be made of a metal, for example a steel alloy. In some embodiments, the sliding plates 4 are made from a material different from the carrier plate 2 and/or the clamping arms 10, for example a plastic, a copper alloy or a brass alloy.

FIG. 11 shows schematically a top view of a clamping device 1 according to a further embodiment. The clamping device 1 shown in FIG. 11 nonetheless substantially corresponds to that of FIG. 10.

In particular, a common factor of the embodiments of FIGS. 10 and 11 is that the clamping arms 10, 10' are not formed symmetrically, in particular with respect to the region around the slotted grooves 31, 31'. Thus a particularly compact construction of the clamping device 1 may be achieved. In this respect, the slotted groove 31 arranged on the clamping arm 10 has a first distance from the pivot axis 12 of the clamping arm 10, and the slotted groove 31' arranged on the clamping arm 10' has a second distance from the pivot axis 12' of the clamping arm 10', wherein the amount of the second distance is greater than the amount of the first distance. The distances correspond to the length of the lever arms.

So that on pivoting of the control cam 20, the two clamping arms 10, 10' each pivot through the same angle about their respective pivot axis 12, 12', or in other words pivot symmetrically relative to one another, the control bolt 32 guided in the slotted groove 10 is arranged on the control cam 20 at a first distance 320 from the control cam pivot axis 21 which is smaller than the distance of the second control bolt 32' guided in the slotted groove 31' from the control cam pivot axis 21. The above-mentioned distances are selected such that the translational ratio provided by the first pair of the slotted groove 31 and control bolt 32 corresponds substantially to the translational ratio provided by the pair of slotted groove 31' and control bolt 32'.

In the closed position of the holding portions 11 shown in FIGS. 10 and 11 respectively, the control cam 20 is present in the predefined closed position. The control bolts 32, 32' are here arranged on the control cam 20 such that in the predefined closed position of the control cam 20, viewed in the direction of the control cam pivot axis 21, they lie on a line which is oriented perpendicularly to a plane 35 formed by the two pivot axes 12, 12'.

In contrast to the embodiment of FIG. 10, in the embodiment of FIG. 11, the control bolts 32' are connected by a connecting wall 324, which may be understood as two interconnected cam portions 322. Firstly, in addition or alternatively to the optional stop 3 (see FIG. 1), the movement of the control cam 20 about the control cam pivot axis 21 may thereby be limited. Since the control bolts 32, 32' are connected via the connecting wall 324, with respect to the control cam pivot axis 21, they have an increased bending stiffness in the radial direction in comparison with the embodiment of FIG. 1.

FIG. 12 shows schematically a top view of the clamping device 1 from FIG. 11 in an open position in which the holding portions 11 are in their open position. Accordingly, the control cam 20 is pivoted through the predefined angle 23, in this case 45°, relative to its orientation in FIG. 11. Via the coupling of the control cam 20 to the clamping arms 10, 10', which is provided by means of the above-described coupling mechanism 30 and which may be regarded as the forced guidance of the coupling arms 10, 10' by the control cam 20, accordingly the coupling arms 10, 10' are also pivoted about their pivot axes 12, 12'.

On pivoting of the control cam 20 between the predefined open position and the predefined closed position, the control bolts 32, 32' move along their assigned slotted grooves 31, 31'. Viewed relative to the slotted grooves 31, 31', this movement of the control bolts 32, 32' constitutes a translational movement component along the longitudinal extent 310 of the slotted grooves 31, 31' and a rotational movement component or a slide movement relative to the side walls 311 of the slotted grooves 31, 31'.

In order to allow the latter rotational movement component, the control bolts 32, 32' have a portion which is curved relative to the respective longitudinal centre axis 325, in this case in the form of an arcuate portion 321. In contrast to the embodiment of FIG. 1, in which the arcuate portion 321 runs over the entire circumference of the cylindrical control bolts 32, 32', the arcuate portion 321 in the embodiment of FIGS. 2 and 3 is delimited by the connecting wall 324.

Figure 13:
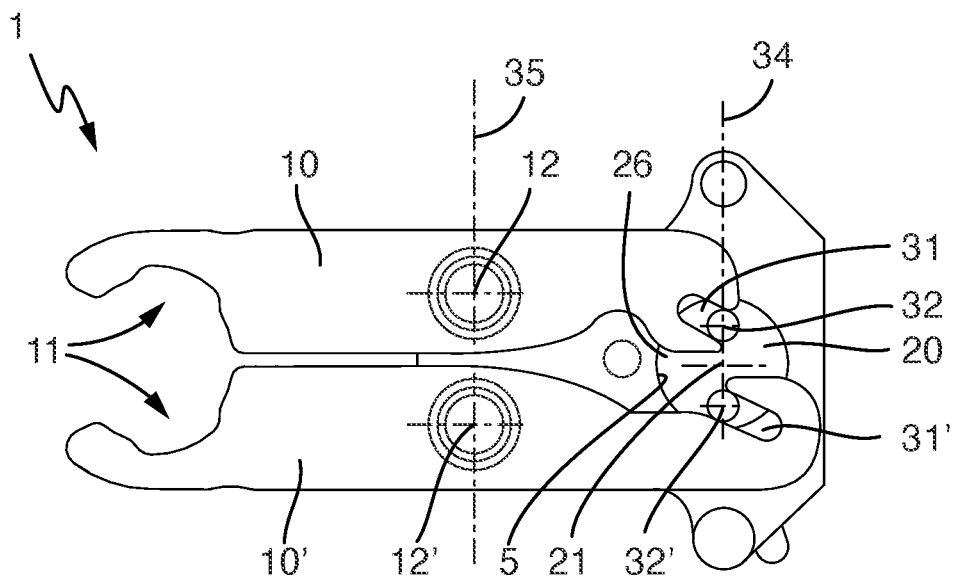
FIG. 13 shows schematically a top view of a clamping device according to a further embodiment, in a closed position.
Figure 14:
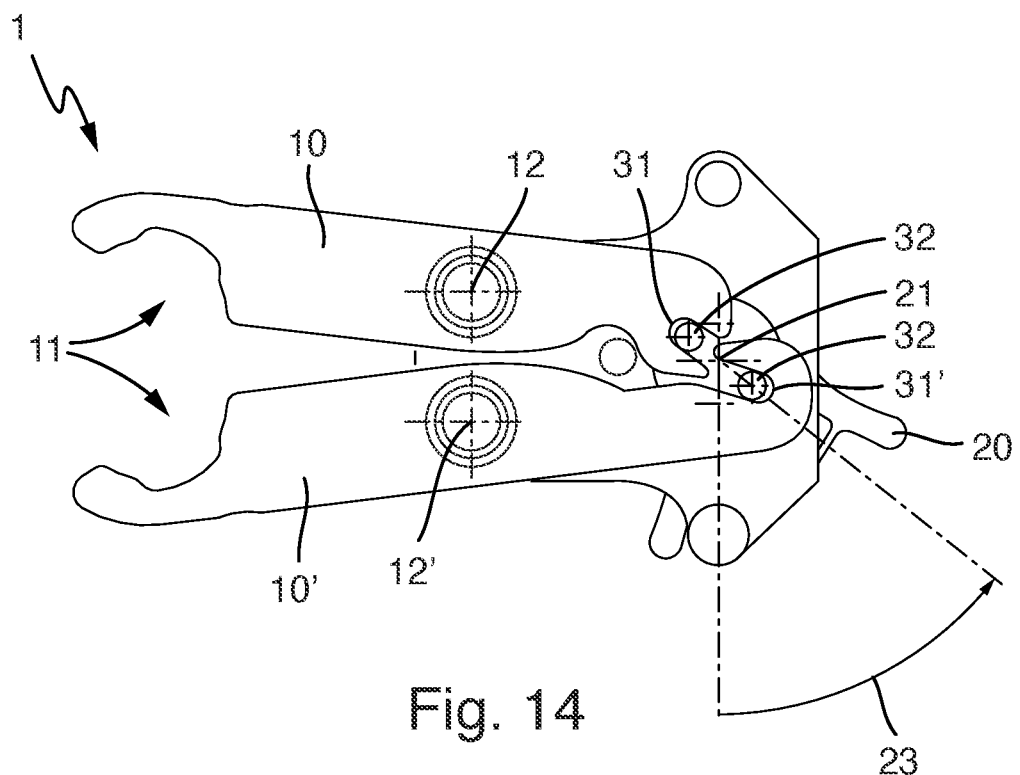
FIG. 14 shows schematically a top view of a clamping device from FIG. 13 in an open position.

FIGS. 13 and 14 each show schematically a top view of a clamping device 1 according to a further embodiment, in a closed position (FIG. 13) and an open position (FIG. 14). The clamping device 1 substantially corresponds to the clamping device 1 from FIG. 10.

In contrast to the clamping devices 1 from FIG. 10 and FIGS. 11 and 12, the clamping device 1 in FIGS. 13 and 14 has a structure such that in the closed position of the clamping device 1, or when the holding portions 11 are in their closed position and accordingly the control cam 20 is in the predefined closed position, the control bolts 32, 32', viewed perpendicularly to the control cam pivot axis 21, lie on a line 34 which lies substantially parallel to the plane 35 formed by the pivot axes 12, 12'. In this embodiment, the holding portions 11 can particularly effectively be prevented from opening under a pivoting of the clamping arms 10, 10' about their pivot axes 12, 12' by a pressure against the holding portions 11, for example because of a sudden impact on a container held in the clamping device 1.

FIG. 15 shows schematically a perspective side view of a clamping device 1 according to a further embodiment, which substantially corresponds to that of FIG. 10.

The clamping device 1 according to FIG. 15, in contrast to the embodiment of FIG. 10, has the control bolts from FIG. 4.

The locking web 323 is formed as described above by a circular flange which is arranged concentrically to the longitudinal centre axis 325 of the control bolt 32, and the outer diameter of which is greater than the width of the slotted groove 31 transversely to its longitudinal extent 310. Thus in the direction of the control cam pivot axis 21, a form fit is created between the clamping arm 10 and the control cam 20 so that in the state shown in FIG. 15, not arranged on a container transport device, the control cam 20 is held on the clamping arm 10.

Figure 16:
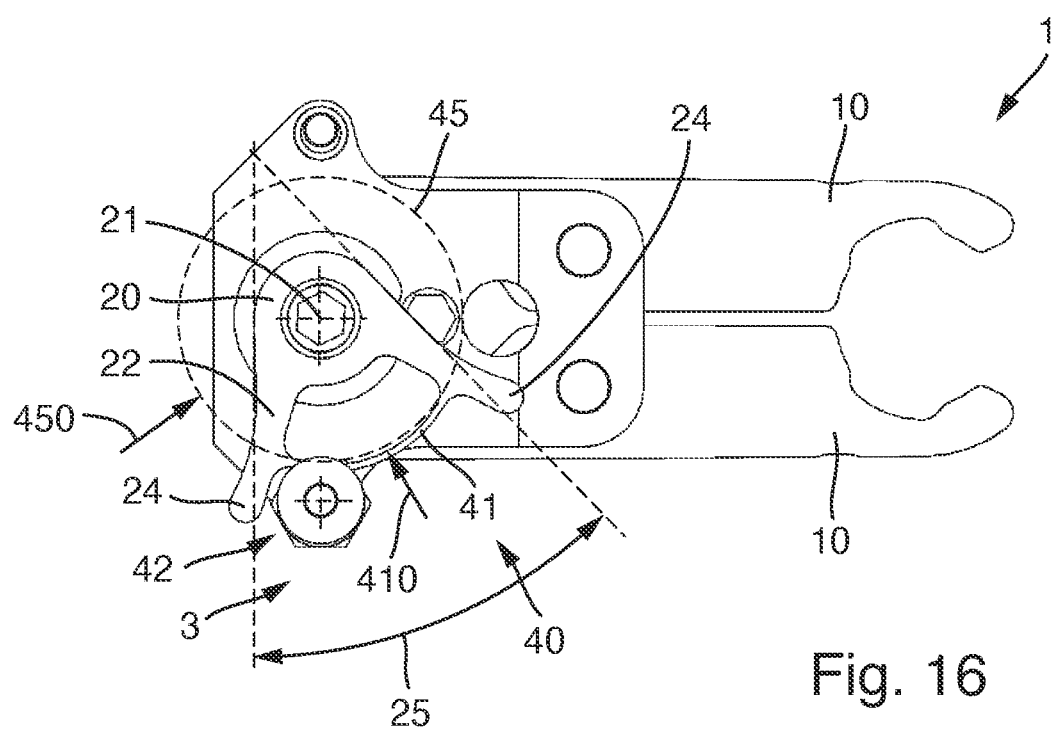
FIG. 16 shows schematically a view from below of the clamping device from FIG. 10.
Figure 17:
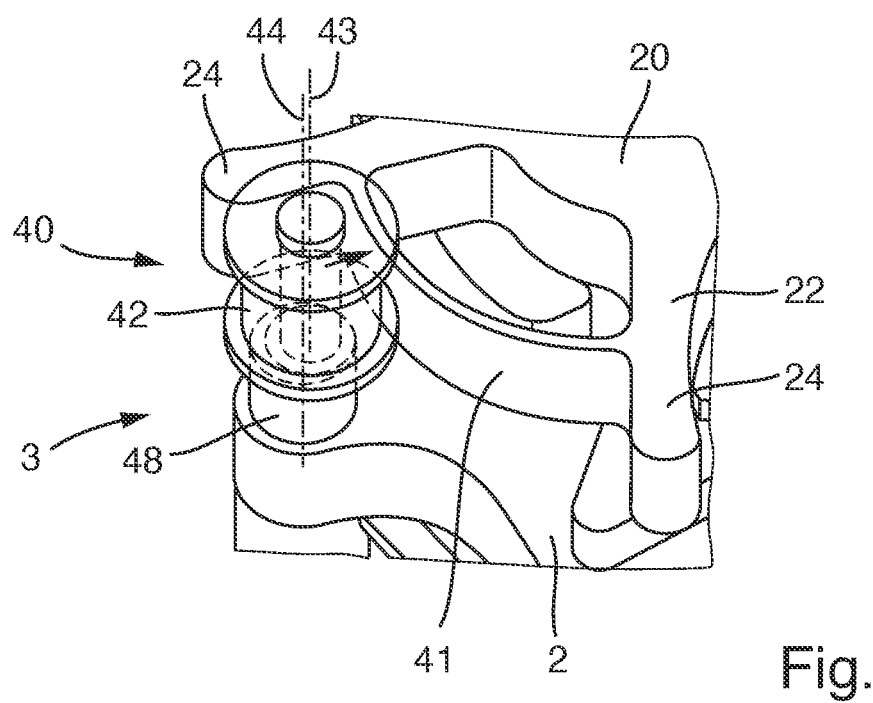
FIG. 17 shows schematically a perspective side view from below of a part region of the clamping device from FIG. 10.

With reference to FIGS. 16 and 17, the pretension device 40 which is common to FIGS. 10 to 15 is now described in more detail.

FIG. 16 shows schematically a view from below of the clamping device 1 from FIG. 10, and FIG. 17 shows schematically a perspective side view from below of a part region of the clamping device 1 from FIG. 10.

The pretension device 40 is configured to hold or pretension the control cam 20 in a predefined end position, either the predefined open position or the predefined closed position.

In the embodiment as common to the clamping devices 1 from FIGS. 10 to 17, the pretension device 40 is provided by the pretension element arranged on the control cam 20, which according to this embodiment takes the form of the spring element 41, in the present case a curved leaf spring, and extends between the arms 24 substantially in the circumferential direction relative to the control cam pivot axis 21. As shown in FIG. 16, on its side pointing towards the running roller 42, the spring element 41 has a curvature, indicated by the curvature radius 410, which is greater than a curvature, indicated by the radius 450, of a geometric pitch circle 45 present concentrically to the control cam pivot axis 21, at the level of the connecting points of the spring element 41 to the arms 24 of the interaction part 22.

As evident in particular from FIG. 17, the stop 3 is formed by a running roller 42 which is mounted rotatably on the carrier plate 2 via a bearing bolt 48, and which is in contact with or rolls over the spring element 41, limited by the arms 24 providing the end positions.

Since the spring element 41 curves radially outward relative to the pitch circle diameter 45 with respect to the control cam pivot axis 21, because of the smaller curvature radius 410 in comparison with radius 450, the spring element 41 exerts a spring force on the running roller 42 which is at its largest in the middle of the spring element 41, and thereby pretensions the running roller 42 into the respective end position. Because of this pretension, the control cam 20 and accordingly the clamping arms 10 are in a stable state, namely either in the open position or in the closed position.

In order to move the clamping arms 10 out of the respective position, the control cam 20 must be moved against the tension provided by the spring element 41. In other words, the force occurring from the spring force of the spring element 41 generated during rolling of the running roller 42 over the spring element 41 because of the resulting elastic bending, must be overcome in order to allow a relative movement of the running roller 42 and control cam 20. When the apex or middle of the spring element 41 is passed, the spring force provided by the spring element 41 because of its bend supports the movement of the control cam 20 into the respective end position.

The stop 3, here in the form of the running roller 42 mounted on the carrier plate 2, is also the stop element which is configured to interact with the pretension element of the control cam 20, provided in this case as a spring element 41, such that the control cam 20 is pretensioned into the predefined open position when the control cam 20 is in the predefined open position, and is pretensioned in the predefined closed position when the control cam 20 is in the predefined closed position.

Reference symbol 25 indicates the extent angle of the interaction portion 22 or the arms 24 in the circumferential direction relative to the control cam pivot axis 21, which angle in this case is 45°.

As shown in FIG. 17, the running roller 42 is mounted on the bearing bolt 48 eccentrically to a bearing bolt 48 arranged rotationally fixedly on the carrier plate 2. Accordingly, the rotational axis 43 of the running roller 42 has a predefined distance from the bearing centre axis 44 of the bearing bolt 48.

By twisting the orientation of the bearing bolt 48 about its longitudinal centre axis 44, a pretension force provided by the spring element 41 can be changed. Accordingly, thus also a holding force of the clamping arms in the respective end position, here the closed position, when the control cam 20 is in the predefined closed position, can be adjusted.

In an alternative embodiment, the bearing bolt 48 may be pretensioned in the circumferential direction relative to the bearing centre axis 44, such that the running roller 42 is pressed in the radial direction relative to the control cam pivot axis 21 onto the control cam 20, in some embodiments in that a torsion spring (not shown here) is provided between the carrier plate 2 and the bearing bolt 48.

If, in this embodiment, the spring element 41 is also provided, the pretension force which holds the control cam 20 in one of the end positions consists of the spring force on the side of the running roller 42 together with the spring force on the side of the spring element 41.

Alternatively, with such a sprung mounting of the running roller 42, which is rotationally mounted eccentrically to the bearing centre axis 44, instead of the elastic spring element 41, a rigid element may be provided which, like the spring element 41, has a curvature greater than that of the pitch circle 45. Then the pretension force for holding the control cam 20 in one of the end positions is provided solely by the spring element (not shown) on the side of the running roller 42.

The shape of the arms 24 and the position of the running roller 42 are predefined such that a lever arm ratio between a lever arm present between the control cam pivot axis 21 and the contact region of the running roller 42 on the arms 24, and the lever arms present between the control bolts 32, 32' and the control cam pivot axis 21, lies substantially between 6:1 and 2:1, and is in various embodiments substantially 5:1, 4:1 or 3:1. The term "substantially" here means that differences resulting from the different distances 320, 320' lie within the rounding or tolerance of the lever arm ratio. In other words, the difference between distances 320, 320' is sufficiently small that the resulting differences from the prescribed lever arms may be ignored.

FIG. 18 shows schematically a view from below of a clamping device 1 according to a further embodiment. The clamping device 1 substantially corresponds to that of FIG. 17 with the exception of the design of the pretension device 40. Instead of the continuous leaf spring which is attached to the arms 24 at both ends or transforms into these, in this embodiment, the control cam 20 corresponding to the embodiment of FIGS. 7 and 8 comprises a pretension element which is formed from a web 46 extending substantially centrally between the arms 24 radially outwardly to the pitch circle 45, and spring elements 41 which extend at the radially outer end of the web 46 substantially in the circumferential direction or tangentially with respect to the control cam pivot axis 21, on both sides of the web 46, in the form of a bending bar with free end, wherein the free end in each case ends at a predefined distance from the respective arm 24.

The spring elements 41 have, as described above, a curvature which is smaller than the curvature of the pitch circle 45. In other words, the curvature radius 410 of the spring element 41 relative to the control cam pivot axis 21 is greater than the radius 450 of the pitch circle 45, at the level of which the web 46 ends.

Accordingly, the free ends 411 lie radially further out than the pitch circle 45 with respect to the control cam pivot axis 21. The running roller 42 forming the stop element is in this case mounted such that if theoretically the web 46 were omitted, it would roll on the pitch circle 45.

Because there is a distance on both sides of the web 46 between the free end 411 there and the respective arm 24, a receiver 49 is formed for receiving by form fit, viewed in the circumferential direction relative to the control cam pivot axis 21, a running roller 42 in the respective end position.

The spring elements 41 are here configured such that they are elastically bent by a predefined amount by the running roller 42 situated in the receiver 49. In this way, they provide a pretension force on the running roller 42 which pretensions the running roller 42 into the respective end position.

In order to move the running roller 42 out of the respective position, the control cam 20 must be moved against the pretension provided by the spring element 41. This embodiment provides a particularly secure holding of the running roller 42 or the control cam 20 in one of the end positions, since the pretension force provided by the spring element 41 on the running roller 42 is greatest in the end positions.

Optionally, as in the embodiment of FIG. 17, the running roller 42 may be mounted eccentrically to the bearing centre axis 44 and/or pretensioned against the control cam.

Figure 19:
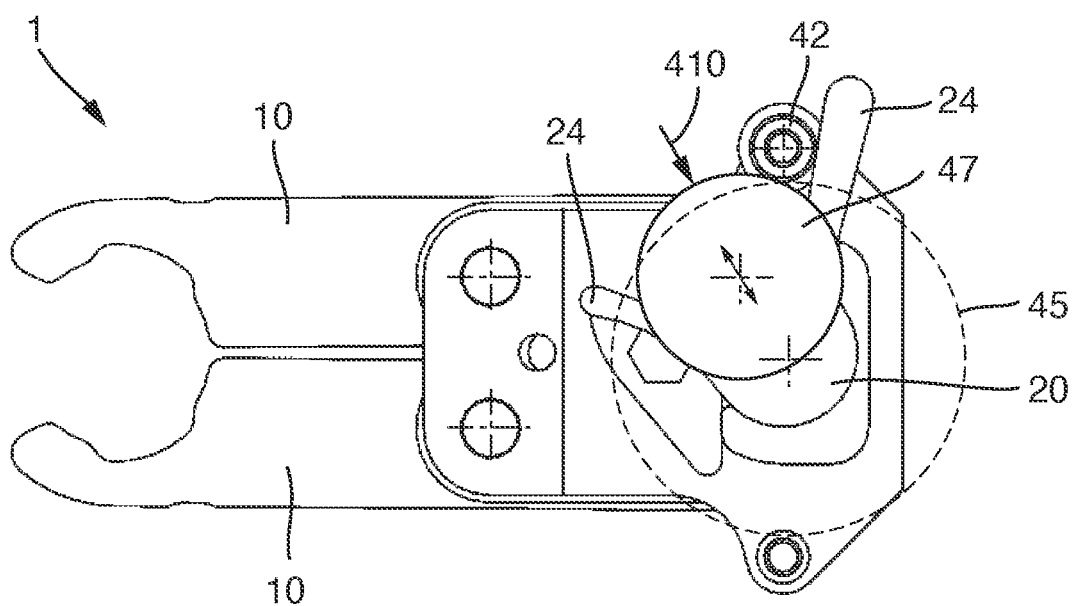
FIG. 19 shows schematically a view from below of a clamping device according to a further embodiment.

FIG. 19 shows schematically a view from below of a clamping device 1 according to a further embodiment. The clamping device 1 substantially corresponds to that of FIG. 17 with the exception of the design of the pretension device 40. Instead of the spring element 41 provided as a continuous leaf spring, a bolt 47 providing the pretension element is spring-mounted in the radial direction on the control cam 20, radially spaced from the control cam pivot axis 21. Like the embodiment in FIG. 17, the bolt 47 has a curvature, indicated by curvature radius 410, which is greater than the curvature of the pitch circle 45. Because of its spring-mounting against the running roller 42, the bolt 47 is pretensioned towards the outside in the radial direction. Accordingly, the running roller 42 is held in one of the end positions by the bolt 47.

Optionally, as in the embodiment of FIG. 17, the running roller 42 functioning as a stop element may be mounted eccentrically to the bearing centre axis 44 and/or pretensioned against the control cam.

Figure 20:
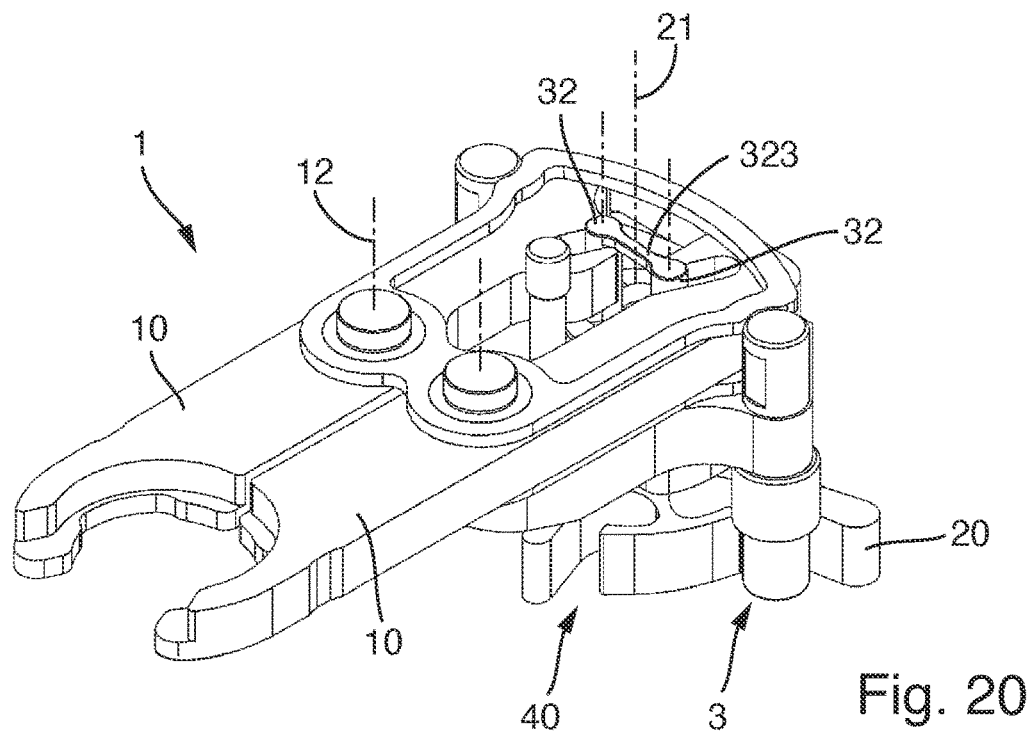
FIG. 20 shows schematically a perspective side view of a clamping device according to a further embodiment.

FIG. 20 shows schematically a perspective side view of a clamping device 1 according to a further embodiment, which substantially corresponds to that of FIG. 18.

In this embodiment, like the embodiment of FIG. 10, the control bolts 32 are configured as a cylindrical pins extending parallel to the control cam pivot axis 21. At their ends above the clamping arms 10, these are connected via a locking web 323 which extends between the two control bolts 32.

The functionality of the locking web 323 corresponds to that described with reference to FIG. 15. In addition, in comparison with the embodiment in FIG. 10, it provides an increased bending stiffness of the control bolt 32 in the radial direction relative to the control cam pivot axis 21.

Figure 21:
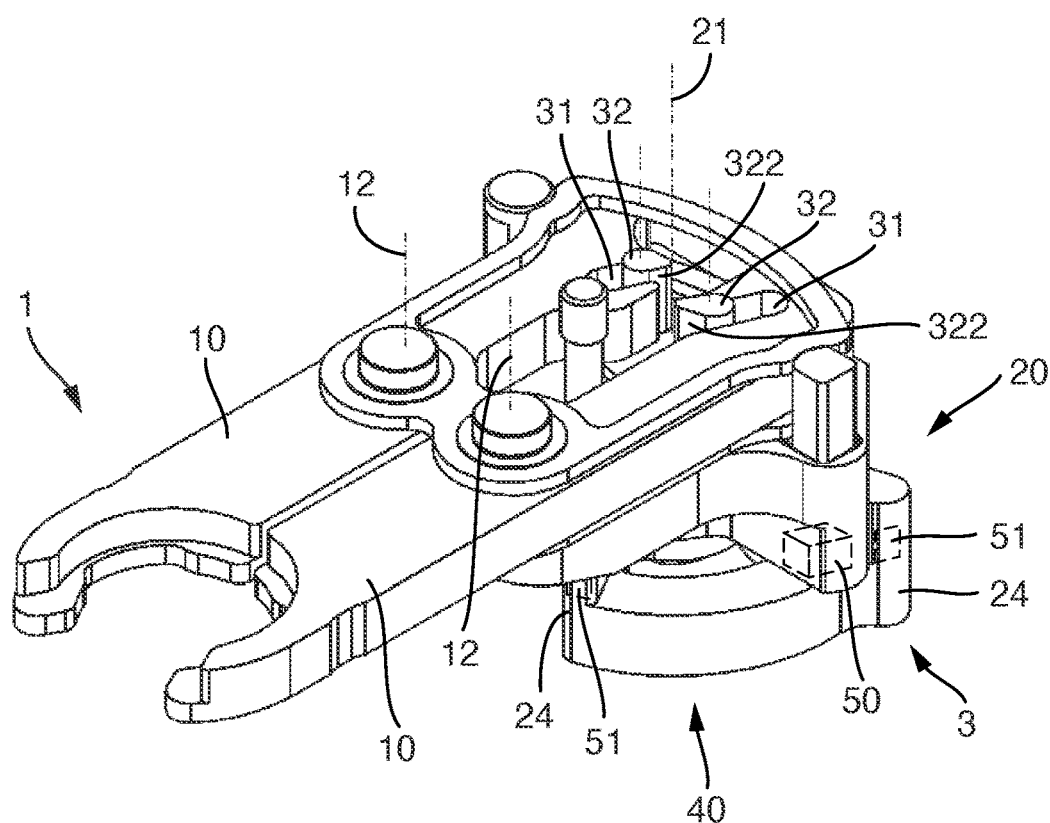
FIG. 21 shows schematically a perspective side view of a clamping device according to a further embodiment.

FIG. 21 shows schematically a perspective side view of a clamping device 1 according to a further embodiment, which substantially corresponds to that of FIG. 10.

The control bolts 32 in this embodiment, in contrast to the embodiment of FIG. 10, each have a cam portion 322 as already described with reference to the control bolt 32' from FIG. 15.

Furthermore, the pretension device 40 is configured as a magnetic pretension device 40. To this end, the stop 3 functioning as a stop element has a magnet 50 which cooperates with a magnetic element 51 of the control cam 20, configured similarly to FIG. 9, which is provided in each of the arms 24, such that a magnetic attraction force is present between the magnet 50 and the respective magnetic element 51 when the control cam 20 is in one of the end positions. The magnetic attraction force holds the control cam 20 in the respective end position. In order to move the control cam 20 out of the respective end position, the magnetic attraction force must be overcome. The magnetic elements 51 arranged in the arms 24 also form the pretension element of the control cam, which is configured to cooperate with the stop 3 functioning as the stop element, or more precisely its magnet 50, such that the control cam 20 is pretensioned in the predefined open position when the control cam 20 is in the predefined open position, and is pretensioned in the predefined closed position when the control cam 20 is the predefined closed position.

Instead of the magnetic element 51, ferromagnetic bodies may also be provided in the arms 24. It is furthermore possible to replace the magnets 50 with a ferromagnetic material, insofar as magnetic elements 51 generating a magnetic field are present in the arms 24.

Figure 22:
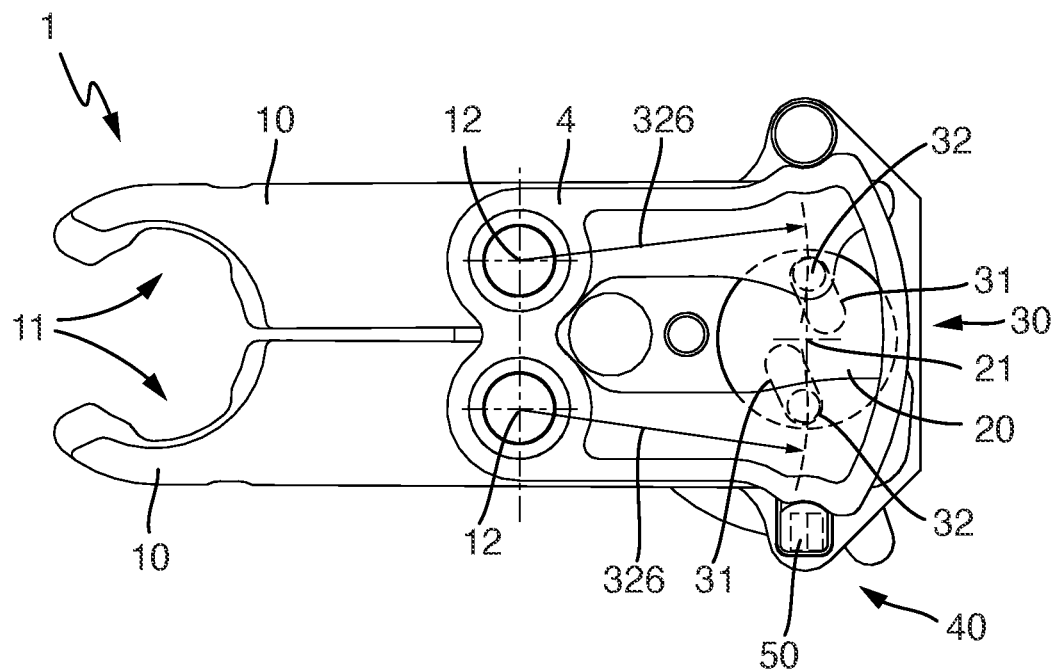
FIG. 22 shows schematically a top view of a clamping device according to a further embodiment.

FIG. 22 shows schematically a top view of a clamping device 1 according to a further embodiment, which substantially corresponds to that of FIG. 10, wherein the pretension device 40 is a magnetic pretension device according to FIG. 21.

The coupling mechanism 30 differs in that the control bolts 32 are provided on the clamping arms 10. They extend from a side of the clamping arms 10 to be regarded as the underside 22, which constitutes a side of the clamping arms 10 pointing in the direction of the control cam 20, parallel to the control cam pivot axis 21 with a predefined length in the direction of the control cam 20.

Each of the control bolts 32 is guided into a blind hole-like slotted groove 31 functioning as a coupling element of the control cam 20 and provided on an end face 27 pointing in the direction of the clamping arms 10, in FIG. 22 the top side of the control cam 20.

The control bolts 32 are each arranged on their clamping arm 10 at a distance or with a radius 326 away from the pivot axis 12 of the respective clamping arm 10. In other words, they pivot about the respective pivot axis 12 on the radius 326.

Figure 23:
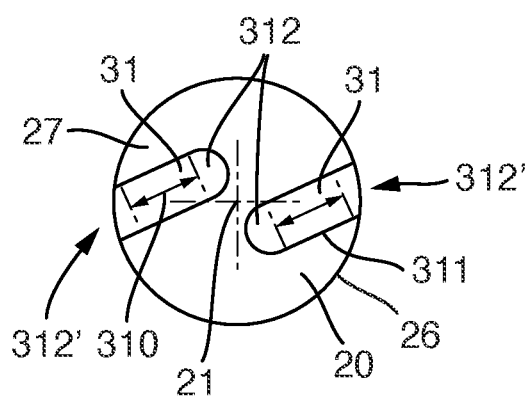
FIG. 23 shows schematically a top view of an upper part of a control cam, similar to the embodiment of FIG. 22.
Figure 24:
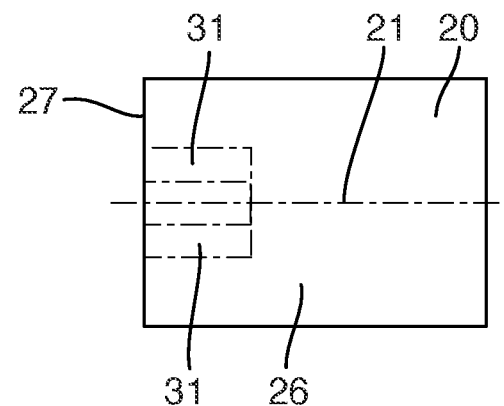
FIG. 24 shows schematically a side view of the part from FIG. 23.

FIGS. 23 and 24 show schematically a top view and a side view of an upper part of a control cam 20, similarly to the embodiment in FIG. 22, wherein in this embodiment the slotted grooves 31 are formed open at one end. In other words, the ends 312' located radially on the outside with respect to the control cam pivot axis 21, are configured as free or open ends 312'. Thus for example a cleaning fluid, which enters the slotted grooves 31 during cleaning of a container treatment device comprising the clamping device 1, can flow out of the slotted grooves 31 again at the open ends 312'.

FIG. 24 shows the design of the slotted grooves 31 as blind holes. The slotted grooves 31 extend with a predefined depth into the control cam 20 from the end face 27 parallel to the control cam pivot axis 21.

Figure 25:
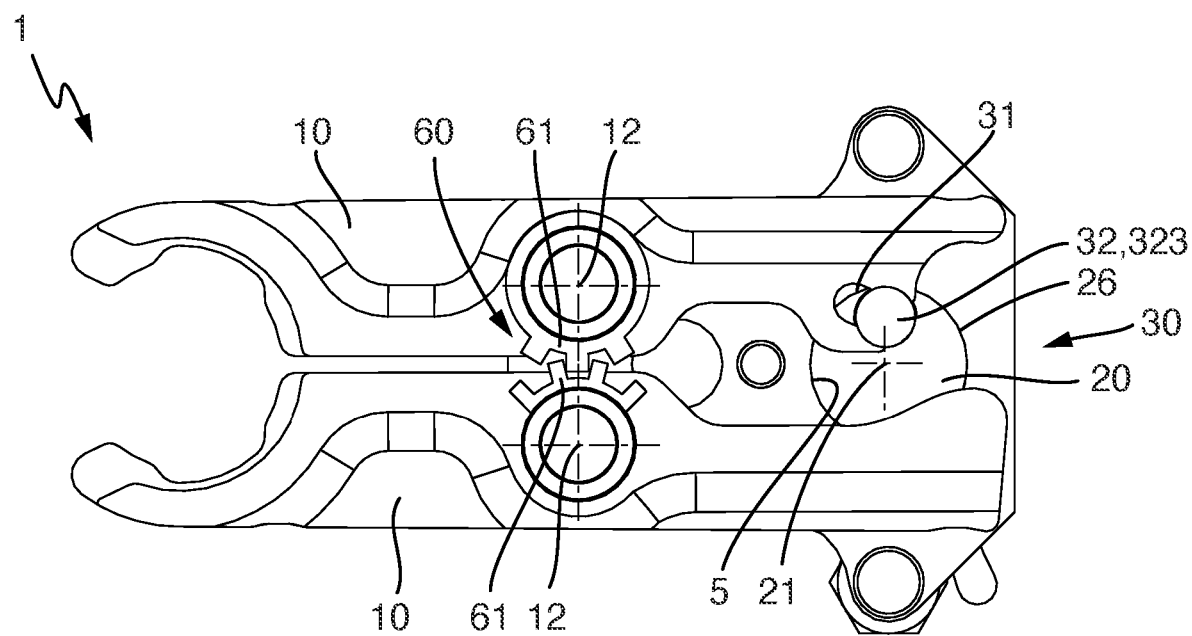
FIG. 25 shows schematically a clamping device according to a further embodiment.

FIG. 25 shows schematically a clamping device 1 according to a further embodiment. The clamping device 1 substantially corresponds to that of FIG. 10 with the following differences:

The coupling mechanism 30 comprises precisely one pair of slotted groove 31 and control bolt 32. Here, the pair of slotted groove 31 and control bolt 32 couples one of the clamping arms 10 directly to the control cam 20. This clamping arm 10 is furthermore rotationally coupled to the other clamping arm 10' via a gear mechanism 60.

In other words, the coupling mechanism 30 in this embodiment comprises the precisely one pair of slotted groove 31 and control bolt 32, for moving the first clamping arm 10 via a movement of the control cam 20, and furthermore the coupling mechanism 30 comprises a rotational coupling unit, in the present case in the form of the gear mechanism 60, for coupling the first clamping arm 10 to the second clamping arm 10' in order thus to provide an indirect coupling, via the clamping arm 10, of the second clamping arm 10' to the control cam 20.

Accordingly, the control cam 20 has precisely one coupling element, here in the form of the control bolt 32. Alternatively, the control cam 20 could also have a slotted groove similar to that of FIGS. 22 to 24, in which a control bolt 32 arranged on one of the clamping arms 10 is then received as described above, in order to provide the coupling between the control cam 20 and the one clamping arm 10.

Both clamping arms 10, 10' have a toothing portion 61 in the form of a gear wheel which is arranged substantially concentrically to the pivot axis 12 of the respective clamping arm 10, 10' and extends perpendicularly thereto. The toothing portions 61 are in engagement with one another, thereby forming the rotational coupling between the clamping arms 10, 10'.

The control bolt 32 furthermore comprises a locking web 323, similarly to the embodiment of FIG. 15.

Figure 26:
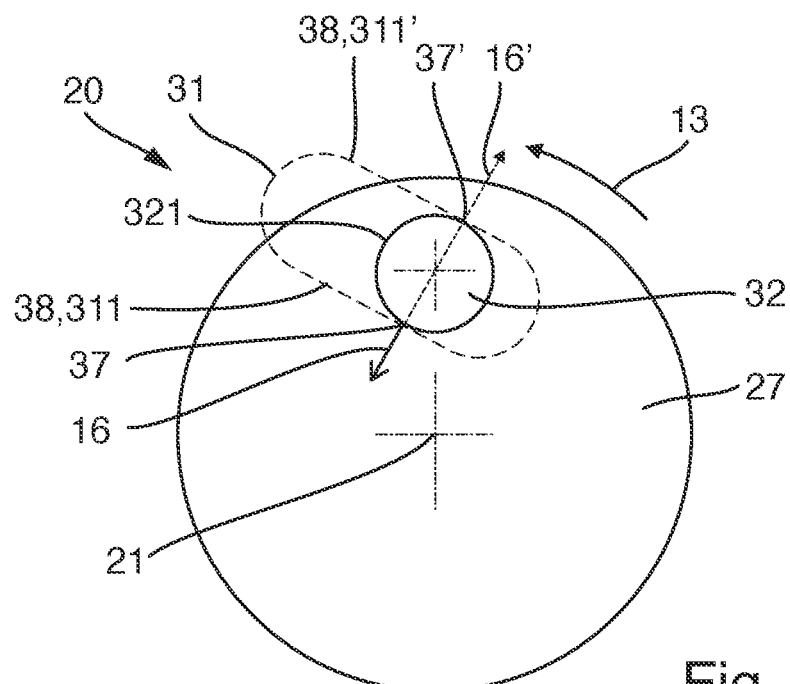
FIGS. 26 and 27 show schematically top views of a detail of the control cam from FIG. 1.

FIG. 26 shows schematically a top view, in the direction of the control cam pivot axis 21, of a detail of the control cam 20 of the clamping device 1 from FIG. 13, wherein for the sake of greater clarity only one of the two control bolts 32 shown. The description below relating to the control bolt 32 also applies to the second control bolt 32', which is not shown here for reasons of clarity.

As evident from FIG. 13, in FIG. 26 the control cam is positioned in the predefined closed position. Accordingly, it pretensions the clamping arms 10, 10' in the closed position. For this, the control bolt 32, at its contact point with the side wall 311' of the slotted groove 31 (here indicated by dotted lines) of the clamping arm 10, transmits a force 37' provided by the pretension device 40 to the clamping arms 10. This force 37' may be regarded as a closing force 37', since this presses the clamping arms 10 into the closed position or holds them in the closed position. The above-mentioned actual contact point of the control bolt 20 may be regarded as a first coupling face border point 37.

Figure 27:
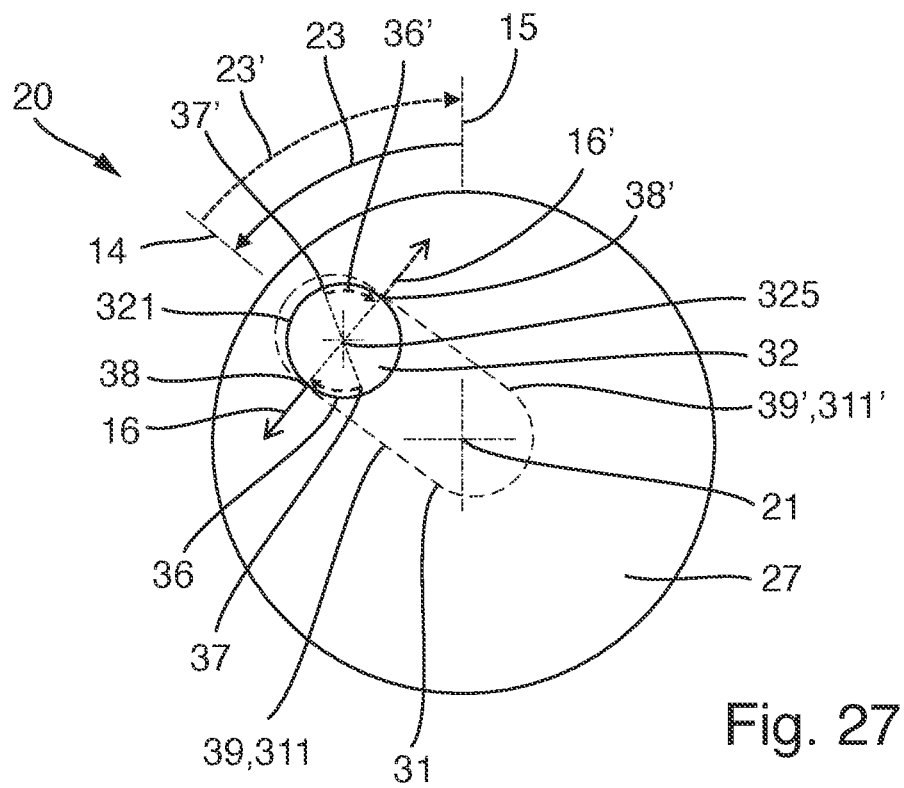

When a switching process is initiated in which the control cam 20 is pivoted out of its predefined closed position, shown in FIG. 26, through the angle 23 into the predefined open position, shown in FIG. 27, the control cam 20, on initiation of the switching process in a pivot direction 13, when the control cam 20 is still substantially in the closed position—apart from a play present between the slotted groove 31 and control cam 32—comes into contact with the (second) side wall 311 of the slotted groove 31 opposite the (first) side wall 311' of the slotted groove 31, and with the (second) side wall 311 forms a contact point similarly to the above-mentioned contact point. This initial contact point with the side wall 311 may be regarded as a first coupling face border point 37 of the control bolt 32. The control cam now exerts a switching force 16, here accordingly an opening force, on the clamping arm 10 which causes a pivoting of the clamping arm 10 out of the closed position.

The term "coupling face border point" is not restricted to a point in the geometric sense but comprises contact types generally known to the person skilled in the art, such as spot contact, line contact and superficial contact. For example, in each case a side wall of the cam portion 322 of a control bolt 32, such as shown in FIG. 7, forms a coupling face border point in the sense of a superficial contact.

FIG. 27 shows schematically a further top view, perpendicularly to the control cam pivot axis 21, of the detail of the control bolt 32 from FIG. 26, wherein the control cam 20 has been pivoted out of the predefined closed position shown in FIG. 26, through the angle 23 into the predefined open position, and accordingly is in the predefined open position (see FIG. 14). The predefined closed position is here indicated with reference sign 15, and the predefined open position 14 with reference sign 14. During movement out of the predefined closed position to the predefined open position, a part of the arcuate portion 321 of the control bolt 32, from the first coupling face border point 37 to a second coupling face border point 38, slides over the side wall 311 of the slotted groove 31 of the clamping arm 10 to be controlled.

The control bolt 32 also comprises a first coupling face 36 extending between the first coupling face border point 37 and the second coupling face border point 38, which is designed and configured to transmit a first switching force 16, here the opening force, onto the slotted groove 31, or more precisely its side wall 311 which may be regarded accordingly as the coupling face 39 of the slotted groove 31 for coupling to the coupling face 36, and if the control cam 20 is pretensioned in the predefined open position, to transmit a pretension force 16 to the clamping arms 10 for pretensioning the clamping arms 10 into the open position.

Reference symbol 23' indicates a pivoting of the control cam 20 out of the predefined open position 14 (back) into the predefined closed position 15. Similarly to the above, on initiation of the pivot process, the control bolt 32 comes into contact with the side wall 311' at a second coupling face border point 38', so that it can transmit a second switching force 16', here a closing force, which is directed opposite the first switching force 16 or the opening force.

The term "opposite" here means that the first switching force 16 and the second switching force 16' each have a circumferential component relative to the control cam pivot axis 21, wherein the circumferential component of the first switching force 16 and the circumferential component of the second switching force 16' are oriented opposite one another or in opposite directions.

The control cam 20 also comprises a second coupling face 36' different from the first coupling face 36. The coupling faces 36, 36' are arranged opposite one another with respect to the control bolt 32, in particular its contour or cross-sectional contour perpendicular to the control cam pivot axis 21, and/or with respect to the longitudinal centre axis 325. Thus alternately, the two switching and in several embodiments pretensioning forces 16, 16' can be transmitted to the clamping arms 10, 10' via the control bolt 32 for switching and/or pretensioning the control cam 20.

Similarly to the above, the coupling faces 39, 39' of the slotted groove 31, which in this optional embodiment substantially correspond to the length of the side walls 311, 311', are arranged opposite one another with respect to the slotted groove 31, in particular its contour or cross-sectional contour perpendicular to the control cam pivot axis 21, and/or with respect to the longitudinal extent 310.

Because the control bolt 32 has the first coupling face 36 which extends in the direction of the control cam pivot axis 21 and is designed and configured for transmitting the first switching force 16 onto the clamping arm 10, and the second coupling face 36' which is different from the first coupling face 36 and extends in the direction of the control cam pivot axis 21, and is designed and configured for transmitting the second switching force 16', directed opposite the first switching force 16, onto the clamping arm 10, via the control bolt 32 functioning as a coupling element, a permanent forced guidance of the clamping arms 10, 10' can be provided both during opening and during closing, and in certain embodiments also a pretension of the clamping arms 10, 10' into the open position or the closed position.

Figure 28:
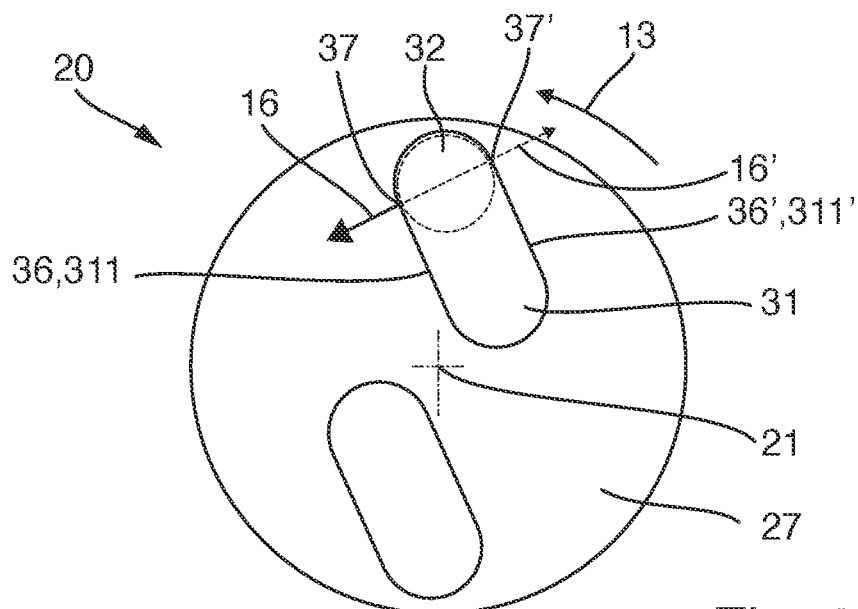
FIGS. 28 and 29 show schematically top views of a detail of the control cam of the clamping device from FIG. 22.
Figure 29:
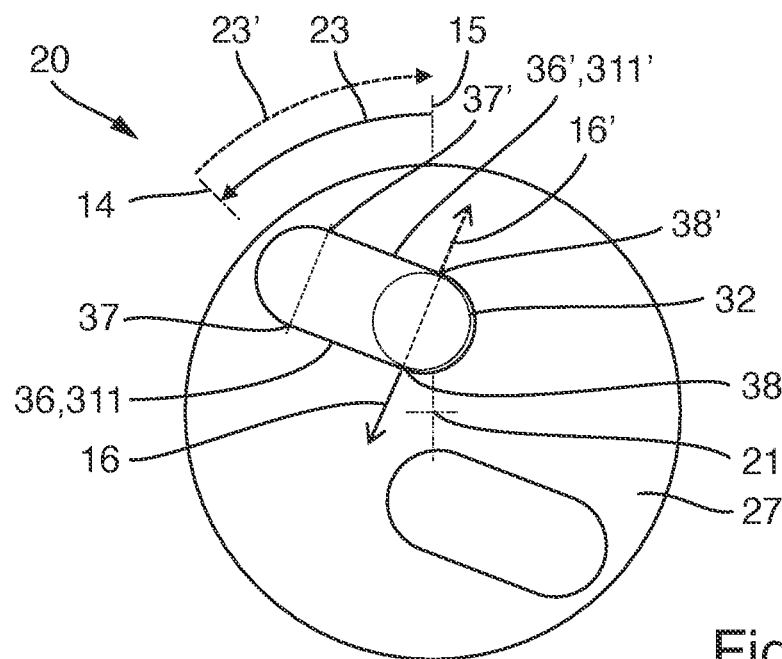

FIGS. 28 and 29 shows top views, in the direction of the control cam pivot axis 21, of a detail of the control cam 20 of the clamping device 1 from FIG. 22, wherein the control cam is in the predefined closed position in FIG. 28 and in the predefined open position in FIG. 29.

Similarly to the description relating to FIGS. 26 and 27, the coupling element of the control cam 20, here configured as a slotted groove 31, has a first coupling face 36 which extends between a first coupling face border point 37 and a second coupling face border point 38, and a second coupling face 36' which extends between a first coupling face border point 37' and a second coupling face border point 38'. Also similarly to FIGS. 26 and 27, the first coupling face 36 is designed and configured for transmitting to the clamping arm 10 the first switching force 16, here the opening force and pretension force into the open position. Furthermore, the second coupling face 36', different from the first coupling face 36 and extending in the direction of the control cam pivot axis 21, is designed and configured for transmitting to the clamping arm 10 the second switching force 16', opposite the first switching force 16, here the closing force and pretension force into the closed position.

Further similarly, the coupling faces 36, 36' are arranged opposite one another with respect to the slotted groove 31, in particular its contour or cross-sectional contour perpendicular to the control cam pivot axis 21, and/or with respect to the longitudinal extent 310. Thus the two switching and in some embodiments pretensioning forces 16, 16' can be transmitted to the clamping arms 10, 10' alternately via the slotted groove 31 for switching and/or pretensioning the control cam 20.

The coupling face 36 corresponds to part of the length of the side wall 311, and the coupling face 36' corresponds to part of the side wall 311'.

If applicable, all individual features that are illustrated in the exemplary embodiments may be combined with one another and/or exchanged without departing from the scope.

What is claimed is:

1. A control cam for controlling a position of clamping arms of a clamping device that are pivotable relative to one another, comprising:
   a shaft portion configured to pivotably mount the control cam about a control cam pivot axis in a hub portion of a carrier plate of the clamping device; and
   a first coupling element comprising:
     a first coupling face that extends in a direction of the control cam pivot axis and is configured to transmit a first switching force onto one of the clamping arms, and
     a second coupling face that is different from the first coupling face, extends in the direction of the control cam pivot axis, and is configured to transmit a second switching force that is directed opposite the first switching force onto the one of the clamping arms,
   wherein the control cam is pivotable about the control cam pivot axis between a predefined open position and a predefined closed position.

2. The control cam of claim 1, wherein the first and second coupling faces are arranged on the first coupling element opposite one another with respect to a contour of the first coupling element or a cross-sectional contour of the first coupling agent that is perpendicular to the control cam pivot axis.

3. The control cam of claim 2, wherein the first coupling element is in a form of a slotted groove configured to receive a control bolt arranged on the one of the clamping arms, or is in a form of the control bolt configured to penetrate into the slotted groove arranged on the one of the clamping arms.

4. The control cam of claim 3, wherein the control bolt extends in the direction of the control cam pivot axis with a predefined height away from an end face of the shaft portion, or the slotted groove extends into the control cam in the direction of the control cam pivot axis with a predefined depth from the end face of the shaft portion.

5. The control cam of claim 3, wherein the first coupling element is in a form of the control bolt, and the control bolt is arranged eccentrically to the control cam pivot axis.

6. The control cam of claim 3, wherein:
   the control bolt comprises a curved portion relative to a longitudinal center axis of the control bolt that is oriented parallel to the control cam pivot axis,
   the control bolt comprises a cam portion that extends in a plane oriented perpendicularly to the control cam pivot axis, and/or
   the first coupling element comprises two control bolts that are connected by a connecting wall, and
   the first coupling face or the second coupling face is arranged in the curved portion and/or in the cam portion.

7. The control cam of claim 3,
   further comprising a radial locking groove configured to receive a fixing element that fixes the control cam axially relative to the control cam pivot axis, and/or
   the control bolt, viewed in the direction of the control cam pivot axis, at its free end opposite an end of the shaft portion, comprises a locking web configured to axially secure the control cam to the clamping device.

8. The control cam of claim 7, wherein the fixing element comprises a fitting key or a locking plate.

9. The control cam of claim 7, wherein:
   the locking web is in a form of a circular flange that is arranged concentrically or eccentrically to a longitudinal center axis of the control bolt,
   an outer diameter of the circular flange is greater than a radius of an arcuate portion of the control bolt, and/or
   the outer diameter of the circular flange is greater than a width of a slotted groove provided on the one of the clamping arms transversely to its longitudinal extent.

10. The control cam of claim 1, further comprising a second coupling element, wherein each coupling element is configured to couple the control cam to a respective clamping arm of the clamping device.

11. The control cam of claim 10, wherein:
    the first coupling element is in a form of a first control bolt having a first distance from the control cam pivot axis,
    the second coupling element is in a form a second control bolt having a second distance from the control cam pivot axis, and
    the second distance is greater than the first distance.

12. The control cam of claim 1, further comprising:
    two arms extending radially outward relative to the control cam pivot axis, and
    an interaction part extending radially relative to the control cam pivot axis, wherein the interaction part is configured to:
      interact with an interaction bolt of a container treatment device,
      limit a scope of movement of the control cam about the control cam pivot axis, and
      cooperate with a stop element of the clamping device.

13. The control cam of claim 1, further comprising a pretension element configured to interact with a stop element of the clamping device such that the control cam is pretensioned into the predefined open position when the control cam is in the predefined open position, and is pretensioned into the predefined closed position when the control cam is in the predefined closed position, wherein the pretension element is configured as an elastic pretension element and/or as a magnetic pretension element.

14. The control cam of claim 13, wherein the pretension element comprises an elastic spring element, and the spring element has a curvature relative to the control cam pivot axis that is greater than a curvature of a geometric pitch circle arranged concentrically to the control cam pivot axis at a level of the spring element.

15. The control cam of claim 14, wherein the spring element is configured as a curved leaf spring in a form of a bolt spring-mounted radially relative to the control cam pivot axis, or is in a form of a bending bar with a free end.

16. The control cam of claim 13, wherein the pretension element comprises:
   a web extending radially outwardly relative to geometric pitch circle arranged concentrically to the control cam pivot axis, and
   a spring element extending from the web transversely to a radial direction relative to the control cam pivot axis, wherein:
   a respective spring element extends on each side of the web, and
   a distance is present between a free end of the spring element and an arm of the control cam lying opposite the free end so as to provide a receiver configured to receive a running roller of the clamping device in a circumferential direction relative to the control cam pivot axis.

17. The control cam of claim 13, wherein the pretension element is configured as a magnetic pretension element, and the magnetic pretension element comprises a magnetic element provided on an arm of the control cam.

18. The control cam of claim 17, further comprising two arms extending radially outward relative to the control cam pivot axis, wherein:
   the magnetic pretension element comprises two magnetic elements arranged in each of the two arms, and
   one magnetic element is arranged and configured so as to cooperate with a magnet of the clamping device when the control cam is fitted in the clamping device such that a magnetic attraction force is present between the magnet and the one magnetic element when the control cam is in the predefined closed position and/or when the control cam is in the predefined open position.

19. A clamping device for holding a container in a container treatment device, comprising:
   two clamping arms, each clamping arm comprising a holding portion configured to hold the container; and
   a control cam comprising:
      a shaft portion configured to pivotably mount the control cam about a control cam pivot axis in a hub portion of a carrier plate of the clamping device; and
      a first coupling element comprising:
         a first coupling face that extends in a direction of the control cam pivot axis and is configured to transmit a first switching force onto one of the clamping arms, and
         a second coupling face that is different from the first coupling face, extends in the direction of the control cam pivot axis, and is configured to transmit a second switching force that is directed opposite the first switching force onto the one of the clamping arms,
   wherein the control cam is pivotable about the control cam pivot axis between a predefined open position and a predefined closed position and the two clamping arms are coupled to the control cam.

20. The clamping device of claim 19, wherein the control cam further comprises a second coupling element, wherein each coupling element is configured to couple the control cam to a respective clamping arm of the clamping device.

* * * * *